United States Patent
Inada et al.

(10) Patent No.: US 9,516,310 B2
(45) Date of Patent: Dec. 6, 2016

(54) MOVING IMAGE DATA GENERATION DEVICE, MOVING IMAGE DISPLAY DEVICE, MOVING IMAGE DATA GENERATION METHOD, MOVING IMAGE DISPLAYING METHOD, AND DATA STRUCTURE OF MOVING IMAGE FILE

(75) Inventors: Tetsugo Inada, Kanagawa (JP); Akio Ohba, Kanagawa (JP); Hiroyuki Segawa, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 312 days.

(21) Appl. No.: 14/234,492

(22) PCT Filed: Jul. 2, 2012

(86) PCT No.: PCT/JP2012/004274
§ 371 (c)(1),
(2), (4) Date: Jan. 23, 2014

(87) PCT Pub. No.: WO2013/018276
PCT Pub. Date: Feb. 7, 2013

(65) Prior Publication Data
US 2014/0153634 A1 Jun. 5, 2014

(30) Foreign Application Priority Data
Aug. 1, 2011 (JP) .................................. 2011-168785

(51) Int. Cl.
*H04N 7/26* (2006.01)
*H04N 7/46* (2006.01)
(Continued)

(52) U.S. Cl.
CPC .......... *H04N 19/00424* (2013.01); *H04N 5/76* (2013.01); *H04N 9/8042* (2013.01);
(Continued)

(58) Field of Classification Search
CPC ............ H04N 7/26; H04N 7/46; H04N 7/12; H04N 11/02; H04N 19/00424; H04N 5/76; H04N 9/8042; H04N 19/162; H04N 19/187; H04N 19/174; H04N 21/8456; H04N 21/234327; H04N 21/23439; H04N 19/115; H04N 19/59; H04N 19/33; H04N 19/61; H04N 19/17; G09G 2340/0407; G09G 2350/00; G06T 3/40
See application file for complete search history.

(56) References Cited

U.S. PATENT DOCUMENTS

| | | | |
|---|---|---|---|
| 4,969,204 A | 11/1990 | Jones | |
| 6,101,276 A * | 8/2000 | Adiletta | H04N 19/159 375/E7.093 |

(Continued)

FOREIGN PATENT DOCUMENTS

| | | |
|---|---|---|
| CN | 1211373 | 3/1999 |
| CN | 1390061 A | 1/2003 |

(Continued)

OTHER PUBLICATIONS

Office Action for corresponding Russian application 2014107671/07 (012166), dated Dec. 11, 2014.
(Continued)

*Primary Examiner* — Dave Czekaj
*Assistant Examiner* — Alison Slater
(74) *Attorney, Agent, or Firm* — Matthew B. Dernier, Esq.

(57) ABSTRACT

Frames of a moving image are configured as a hierarchical structure where each frame is represented with a plurality of resolutions. Some layers are set as original image layers, and the other layers are set as difference image layers in hierarchical data representing a frame at each time step. In the case that an area is to be displayed in the resolution of the difference image layer, to respective pixel values of a difference image of the area, respective pixel values of an image of a corresponding area retained by the original image layer of lower resolution, the image enlarged to the resolution of the difference image layer, are added. A layer to be set as a difference image layer is switched to another layer as time passes.

23 Claims, 17 Drawing Sheets

(51) Int. Cl.

| | | |
|---|---|---|
| *H04N 7/12* | (2006.01) | |
| *H04N 11/02* | (2006.01) | |
| *H04N 19/30* | (2014.01) | |
| *H04N 19/33* | (2014.01) | |
| *H04N 19/59* | (2014.01) | |
| *H04N 21/2343* | (2011.01) | |
| *H04N 21/845* | (2011.01) | |
| *H04N 19/115* | (2014.01) | |
| *H04N 19/162* | (2014.01) | |
| *H04N 19/174* | (2014.01) | |
| *H04N 19/187* | (2014.01) | |
| *H04N 5/76* | (2006.01) | |
| *H04N 9/804* | (2006.01) | |

(52) U.S. Cl.
CPC .......... *H04N19/115* (2014.11); *H04N 19/162* (2014.11); *H04N 19/174* (2014.11); *H04N 19/187* (2014.11); *H04N 19/33* (2014.11); *H04N 19/59* (2014.11); *H04N 21/23439* (2013.01); *H04N 21/234327* (2013.01); *H04N 21/8456* (2013.01)

(56) References Cited

U.S. PATENT DOCUMENTS

| | | | |
|---|---|---|---|
| 6,535,644 B1* | 3/2003 | Kurapati | H04N 19/63 375/240.01 |
| 6,563,999 B1 | 5/2003 | Suzuoki | |
| 6,571,017 B1 | 5/2003 | Aya | |
| 6,580,754 B1 | 6/2003 | Wan | |
| 8,878,869 B2 | 11/2014 | Inada | |
| 9,047,680 B2 | 6/2015 | Kawai | |
| 2001/0028405 A1 | 10/2001 | Kondo | |
| 2002/0054338 A1* | 5/2002 | Kimura | G06T 9/007 358/1.15 |
| 2003/0059122 A1 | 3/2003 | Aya | |
| 2004/0017852 A1* | 1/2004 | Garrido | H04N 7/0125 375/240.16 |
| 2004/0039663 A1* | 2/2004 | Kernz | G06F 17/30274 705/26.3 |
| 2005/0195900 A1 | 9/2005 | Han | |
| 2007/0133675 A1 | 6/2007 | Honda | |
| 2008/0247462 A1* | 10/2008 | Demos | H04N 19/597 375/240.03 |
| 2011/0051808 A1* | 3/2011 | Quast | H04N 7/18 375/240.08 |
| 2011/0150330 A1* | 6/2011 | Jannard | H04N 19/30 382/166 |
| 2011/0221780 A1 | 9/2011 | Inada | |
| 2012/0189221 A1 | 7/2012 | Inada | |
| 2012/0206491 A1 | 8/2012 | Kawai | |

FOREIGN PATENT DOCUMENTS

| | | |
|---|---|---|
| CN | 1435055 A | 8/2003 |
| CN | 1875636 A | 12/2006 |
| EP | 0497058 A2 | 8/1992 |
| EP | 0627859 A2 | 12/1994 |
| EP | 1065882 A1 | 1/2001 |
| EP | 1249131 A1 | 10/2002 |
| EP | 2012545 A2 | 1/2009 |
| EP | 2330587 A1 | 6/2011 |
| JP | 2002058028 A | 2/2002 |
| JP | 2002058032 A | 2/2002 |
| JP | 2004056335 A | 2/2004 |
| JP | 2011060070 A | 3/2011 |
| WO | 0147283 A1 | 6/2001 |
| WO | 2010038337 A1 | 4/2010 |
| WO | 2011013263 A1 | 2/2011 |
| WO | 2011030484 A1 | 3/2011 |

OTHER PUBLICATIONS

Office Action for corresponding JP Patent Application No. 2011-168785, dated Oct. 23, 2013.
International Search Report for corresponding application PCT/JP2012/004274, dated Jul. 24, 2012.
European Search Report for corresponding EP Application 12819352.1(012166), dated Feb. 18, 2015.
Rakeshkumar Gandhi et al: 11 MPEG-like pyramidal video coder 11 Proceedings of SPIE. vol. 2094. 22, pp. 1-12, Oct. 1993.
Aditya Mavlankar et al: "Optimal slice size for streaming regions of high resolution video with virtual pan/tilt/zoom functionality", Proc. of 15th European Signal Processing Conference (EUSIPCO). pp. 1-5, Sep. 30, 2007.
Wang L et al: "Reduced-Difference Pyramid: A Data Structure for Progressive Image Transmission", Optical Engineering. Soc. of Photo-Optical Instrumentation Engineers. Bellingham vol. 28. No. 7. pp. 708-716, Jul. 1, 1989.
Ortiz J P G et al: "JHelioviewer: Visualizing Large Sets of Solar Images Using JPEG 2000", Computing in Science and Engineering. IEEE Service Center. Los Alamitos. CA. US. vol. 11. No. 5., pp. 1-10 Sep. 1, 2009.
Office Action for corresponding Russian Application No. 2014107671/07 (012166), dated May 12, 2015.
European Search Report for corresponding EP Application No. 12819352.1-1905, dated Jun. 22, 2015.
Hu Jia et al: "High performance video compression based on improved VSPIHT algorithm" Signal Processing. 2004. Proceedings. ICSP '04. 2004 7th International Conference on Beijing. China Aug. 31-Sep. 4, 2004. vol. 2. pp. 1199-1202, Aug. 31, 2004 (Aug. 31, 2004).
International Preliminary Report on Patentability and Written Opinion for corresponding application PCT/JP2012/004274, dated Feb. 13, 2014.
Office Action for corresponding CN Application No. 2012800367359, 17 Pages, dated Apr. 15, 2016.

* cited by examiner

MOVING IMAGE DATA GENERATION DEVICE, MOVING IMAGE DISPLAY DEVICE, MOVING IMAGE DATA GENERATION METHOD, MOVING IMAGE DISPLAYING METHOD, AND DATA STRUCTURE OF MOVING IMAGE FILE

TECHNICAL FIELD

The present invention relates to a moving image data generation device that generates data on a moving image, a moving image display device that displays a moving image, and a moving image data generation method and a moving image displaying method realized by those devices.

BACKGROUND ART

Home entertainment systems are proposed that are capable of playing back moving images as well as running game programs. In the home entertainment systems, a GPU generates three-dimensional images using polygons (see, e.g., patent document 1).

Regardless of whether an image is a moving image or a still image, improvement in efficiency of displaying the image is an important and constant challenge. Therefore, various technologies have been developed and put into a practical use in many ways such as a compression technology, a transmission technology, an image processing technology, and a display technology of image data, which allows high-definition images to be enjoyed in various scenes in a familiar manner.

RELATED ART LIST

Patent Document

[Patent Document 1] U.S. Pat. No. 6,563,999

SUMMARY OF THE INVENTION

Problem to be Solved by the Invention

There is always a demand for displaying high-definition images with good responsiveness in accordance with user requests. For example, in order to realize image display that offers freedom with respect to user's point of view such as enlarging an area of user's interest in the entire image being displayed or moving the area to another area, with good responsiveness, it is necessary to allow for random access while processing large sized image data in a short period of time. Thus, there is a need for further progress of technologies.

In this background, a purpose of the present invention is to provide an image processing technology capable of displaying high-definition moving images with good responsiveness with respect to user operation input for a display area while putting restriction on data size.

Means to Solve the Problem

One embodiment of the present invention relates to a moving image data generation device. The moving image data generation device generates hierarchical moving data configured by hierarchizing in order of resolutions a plurality of series of images that are representations of image frames constituting one moving image in different resolutions in order to generate a display image while switching a layer to be used to another layer in accordance with a resolution required in an image processing device that displays an image. The moving image data generation device includes: a hierarchical data generating unit configured to generate image data of respective layers for each image frame by reducing each image frame into a plurality of sizes, and configured to include, in image data of at least one layer, data on a difference image representing a subtraction from an enlarged image of an image on a different layer, the image being a representation of a same image frame with a resolution lower than that of the one layer, so as to generate hierarchical moving image data; and a compressed data generating unit configured to compress and encode the hierarchical moving image data generated by the hierarchical data generating unit, and to store the compressed and encoded hierarchical moving image data in a storage device.

Another embodiment of the present invention relates to a moving image display device. The moving image display device includes: a moving image data storage unit configured to store hierarchical moving data configured by hierarchizing in order of resolutions a plurality of series of images that are representations of image frames constituting one moving image in different resolutions; an input information acquisition unit configured to acquire a signal requesting to move a display area in a moving image being displayed; a display image processing unit configured to generate a display image according to the signal requesting to move for each image frame, while switching a layer to be used to another layer, the layers included in the hierarchical moving image data, in accordance with a required resolution determined by the signal requesting to move acquired by the input information acquisition unit, wherein image data of at least one layer among layers constituting the hierarchical moving image data includes data on a difference image representing a subtraction from an enlarged image of an image on a different layer, the image being a representation of a same image frame with a resolution lower than that of the one layer, and wherein the display image processing unit restores an image by enlarging and adding the image on the different layer, if data to be used for displaying is data on a difference image.

Still another embodiment of the present invention relates to a moving image data generation method. The moving image data generation method generates hierarchical moving data configured by hierarchizing in order of resolutions a plurality of series of images that are representations of image frames constituting one moving image in different resolutions in order to generate a display image while switching a layer to be used to another layer in accordance with a resolution required in an image processing device that displays an image. The moving image data generation method includes: reading moving image data comprising a series of image frames depicted with one resolution from a storage device; generating image data of respective layers for each image frame by reducing each image frame into a plurality of sizes; including, in image data of at least one layer, data on a difference image representing a subtraction from an enlarged image of an image on a different layer, the image being a representation of a same image frame with a resolution lower than that of the one layer, so as to generate hierarchical moving image data; and compressing and encoding the hierarchical moving image data and storing the compressed encoded hierarchical moving image data in the storage device.

Yet another embodiment of the present invention relates to a moving image displaying method. The moving image displaying method includes: reading from a storage device at least a portion of hierarchical moving data configured by hierarchizing in order of resolutions a plurality of series of images that are representations of image frames constituting one moving image in different resolutions, and starting to display a moving image on a display device by using the at least a portion of hierarchical moving data; acquiring a signal requesting to move a display area in a moving image being displayed; generating a display image according to the signal requesting to move for each image frame, while switching a layer to be used to another layer, the layers included in the hierarchical moving image data, in accordance with a required resolution determined by the signal requesting to move; and displaying the generated display image on the display device, wherein image data of at least one layer among layers constituting the hierarchical moving image data includes data on a difference image representing a subtraction from an enlarged image of an image on a different layer, the image being a representation of a same image frame with a resolution lower than that of the one layer, and wherein the generating a display image includes restoring an image by enlarging and adding the image on the different layer, if data to be used for displaying is data on a difference image.

Yet another embodiment of the present invention relates to a data structure of a moving image file to be displayed on a display device. In the data structure, a) a range of resolutions determined by an operation input by a user regarding a display area; and b) hierarchical moving data, which is generated by hierarchizing in order of resolutions a plurality of series of images that are representations of image frames constituting one moving image in different resolutions, and which is used by switching layers in accordance with the range of resolutions, wherein image data of at least one layer includes data on a difference image representing a subtraction from an enlarged image of an image on a different layer, the image being a representation of a same image frame with a resolution lower than that of the one layer, and wherein the image on the different layer is enlarged and added so as to restore an image when displaying an image, are associated with each other.

Optional combinations of the aforementioned constituting elements, and implementations of the invention in the form of methods, apparatuses, systems, computer programs, or the like may also be practiced as additional modes of the present invention.

Advantageous Effect of the Invention

According to the present invention, displaying of a moving image can be realized with smooth responsiveness with respect to an operation input by a user regarding a display area.

MODE FOR CARRYING OUT THE INVENTION

According to the present embodiment, a display area can be moved, corresponding to a request for moving a viewpoint from a user, when a moving image is displayed. Moving a viewpoint includes moving the viewpoint close to or far from an image plane, and the moving image is enlarged or reduced in accordance therewith while the moving image is played back. In such an embodiment, the more a variable range of a resolution is broadened, and the bigger a size of an image becomes, the more difficult it becomes to display a moving image of a requested area with smooth and good responsiveness in response to an operation input by a user.

Therefore, according to the embodiment, data on a moving image to be displayed is configured as a hierarchical structure where a frame of the moving image is represented with a plurality of resolutions, and hierarchized in the order of the resolutions. Further, a moving image stream is formed for each block obtained by spatially dividing a frame in each layer of the hierarchy. Good responsiveness is obtained by switching a layer to be used for displaying to another layer and a moving image stream to be used for displaying to another moving image stream in accordance with the movement of a display area. Hereinafter, moving image data having such a hierarchical structure is also referred to as "hierarchical data."

Figure 1:
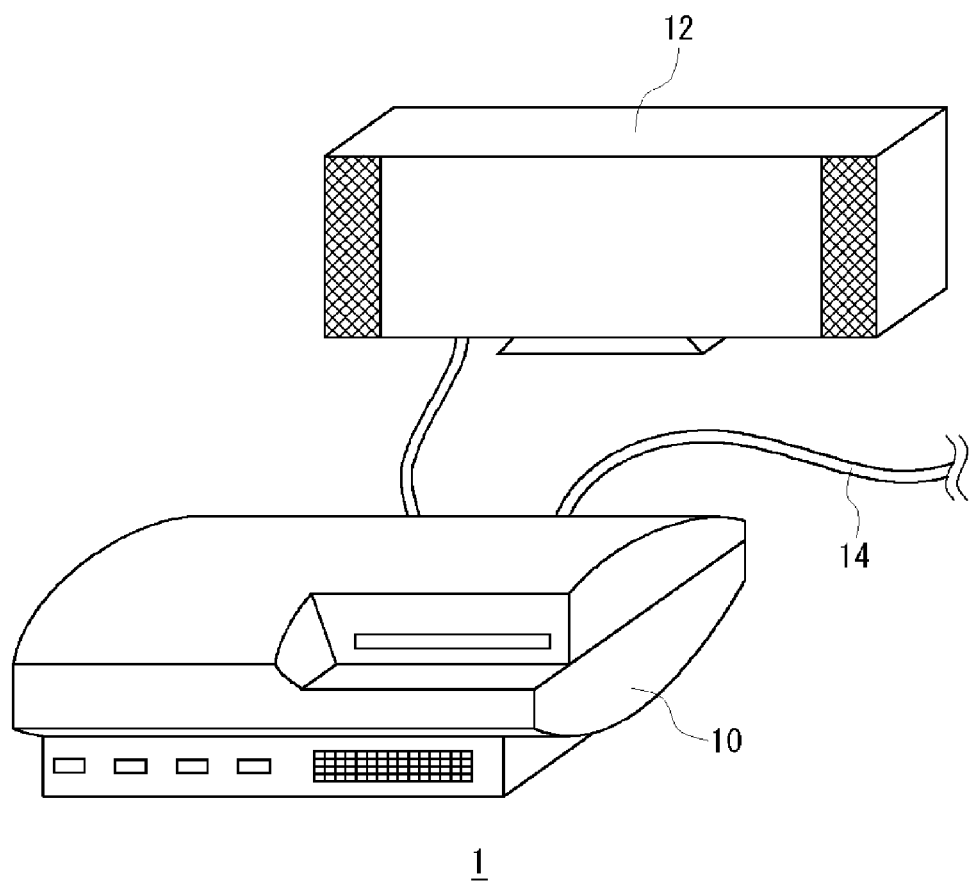
FIG. 1 is a diagram illustrating an environment where an image processing system which can be used for the present embodiment.

An explanation is first given of the basic mode for displaying such hierarchical data. FIG. 1 illustrates an environment in which an image processing system 1 to which the present embodiment can be applied is used. The image processing system 1 comprises an image processing device 10 for executing image processing software and a display device 12 for outputting a processing result by the image processing device 10. The display device 12 may be a television set provided with a display for outputting an image and a speaker for outputting sound.

The display device 12 may be connected to the image processing device 10 via a cable or connected wirelessly via a wireless Local Area Network (LAN) or the like. The image processing device 10 in the image processing system 1 may be connected to an external network such as the Internet or the like by a cable 14 so as to download and acquire moving image data. The image processing device 10 may be connected to an external network via wireless communication.

The image processing device 10 may be, e.g., a game device or a personal computer, and an image processing function may be achieved by loading an application program for image processing. The image processing device 10 enlarges/reduces a moving image displayed on a display of the display device 12 or scrolls the moving image upward, downward, leftward, or rightward, in accordance with a request for moving a viewpoint from a user. Hereinafter, such a change of a display area including enlargement/reduction is referred to as a "movement of a display area." When the user operates an input device while viewing an image displayed on the display, the input device transmits to the image processing device 10 a signal requesting to move a display area.

Figure 2:
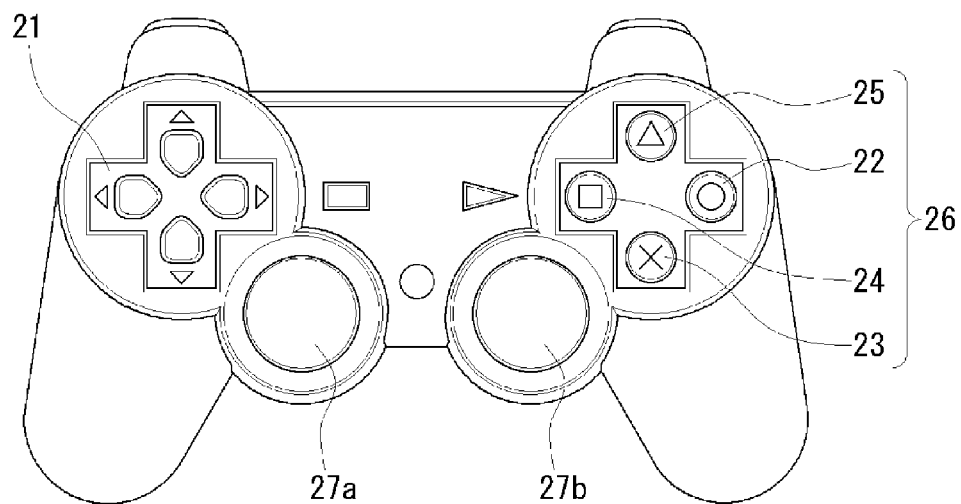
FIG. 2 shows an example of the exterior configuration of an input device that can be used for the image processing system of FIG. 1.

FIG. 2 illustrates an example of the exterior configuration of an input device 20. The input device 20 is provided with directional keys 21, analog sticks 27a and 27b, and four types of control buttons 26, as a means of operation that can be manipulated by a user. The four types of control buttons 26 comprise a circle button 22, a cross button 23, a square button 24, and a triangle button 25.

The operation means of the input device 20 in the image processing system 1 is assigned a function of entering a request for enlarging/reducing a display image and a function of entering a request for scrolling upward, downward, leftward, or rightward. For example, the function of entering a request for enlarging/reducing a display image is assigned to the right analog stick 27b. A user can input a request for reducing a display image by pulling the analog stick 27b toward the user and can input a request for enlarging the display image by pushing the analog stick 27b away from the user.

The function of entering a request for scrolling is assigned to the directional keys 21. By pressing the directional keys 21, the user can enter a request for scrolling in the direction in which the directional keys 21 are pressed. The function of entering a request for moving a display area may be assigned to an alternative operation means. For example, the function of entering a request for scrolling may be assigned to the analog stick 27a.

The input device 20 has a function of transmitting to the image processing device 10 a signal requesting to move a display area that has been input. In the present embodiment, the input device 20 is configured such that the input device 20 is capable of communicating wirelessly with the image processing device 10. The input device 20 and the image processing device 10 may establish a wireless connection using Bluetooth® protocol, IEEE 802.11 protocol, or the like. The input device 20 may be connected to the image processing device 10 via a cable so as to transmit to the image processing device 10 a signal requesting to move a display area.

The input device 20 is not limited to the one shown in FIG. 2. The input device 20 may be a keyboard, a touch panel, a button, or the like that are operated by a user, a camera that captures an image of a target object, a microphone that acquires sound, or the like and can be any type of and/or any appearance of interface as far as the interface can acquire user's intention, the movement of a target object, or the like as electrical information.

Figure 3:
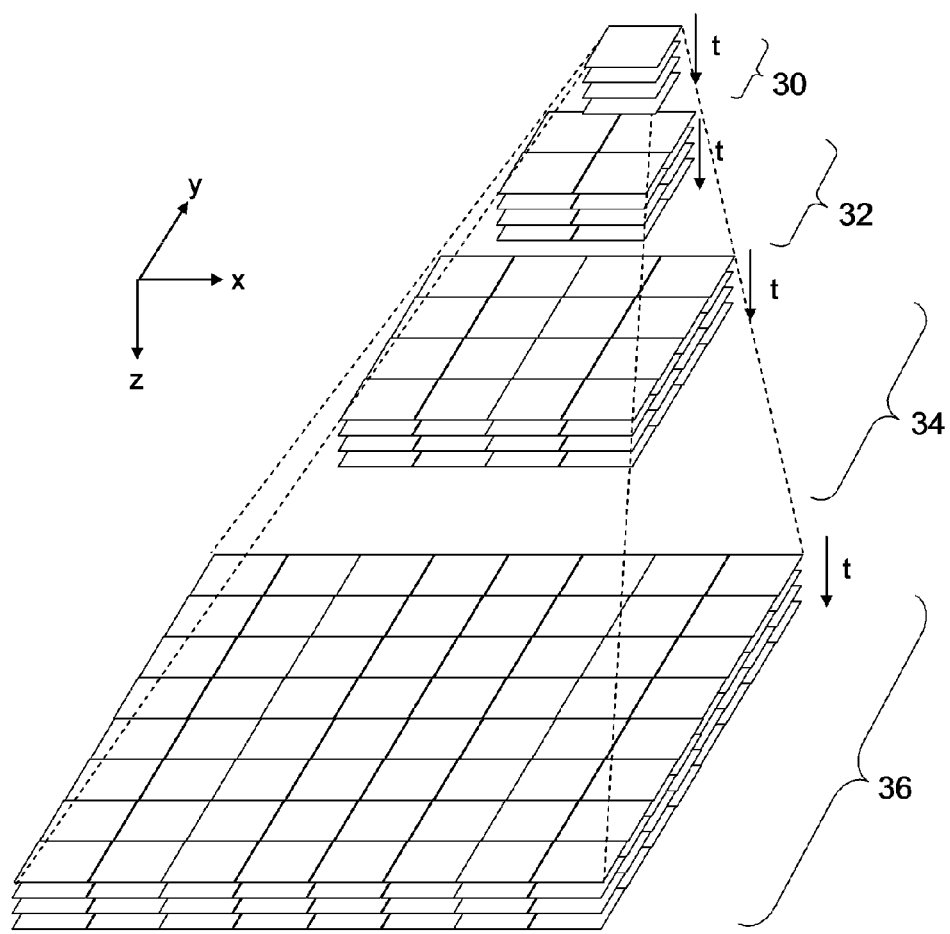
FIG. 3 conceptually shows hierarchical data on a moving image to be processed according to the present embodiment.

FIG. 3 conceptually illustrates hierarchical data on a moving image to be processed in the present embodiment. The hierarchical data has a hierarchical structure comprising a 0-th layer 30, a first layer 32, a second layer 34, and a third layer 36 in a z axis direction, that is, the direction from the top to the bottom of the figure. While the figure shows only four layers, the number of layers is nonrestrictive. As described above, each layer is composed of moving image data on a single moving image represented with different resolutions, i.e., data on a plurality of image frames arranged in chronological order. In the figure, each layer is symbolically represented by four image frames. The number of image frames obviously varies depending on the playback time and the frame rate of a moving image.

The hierarchical data has, for example, a quadtree hierarchical structure; when image frames that constitute the layers are divided into "tile images" having the same size, the 0-th layer 30 is composed of one tile image, the first layer 32 is composed of 2 by 2 tile images, the second layer 34 is composed of 4 by 4 tile images, and the third layer is composed of 8 by 8 tile images, and the like. In this case, the resolution in an N-th layer (N is an integer equal to or greater than 0) is ½ the resolution of the (N+1)-th layer in both the horizontal (X axis) direction and the vertical (Y axis) direction on an image plane. The hierarchical data can be generated by, e.g., reducing an image frame in a plurality of stages based on a moving image in the third layer 36 having the highest resolution.

Both the coordinates of a viewpoint at the time of the display of a moving image and a corresponding display area can be represented in a virtual three-dimensional space formed by an x axis representing the horizontal direction of the image, a y axis representing the vertical direction of the image, and a z axis representing the resolution, as shown in FIG. 3. As described above, moving image data in which a plurality of image frames are sequentially arranged is prepared as a layer in the present embodiment. Thus, an image that is actually displayed also depends on the amount of time spent since the start of the reproduction. Therefore, the time axis t is also shown for each layer in the figure.

The image processing device 10 basically renders an image frame of any one of the layers along a time axis t in series at a predetermined frame rate. For example, the image processing device 10 displays a moving image of the resolution of the 0-th layer 30 as a reference image. If a signal requesting to move the display area is provided from the input device 20 during this process, the image processing device 10 derives the amount of change in the display image from the signal and derives the coordinates at the four corners of a subsequent frame (frame coordinates) in the virtual space by using the amount of change. The image processing device 10 then renders an image frame that corresponds to the frame coordinates. In this case, by providing a switching boundary for layers with respect to the z axis, the image processing device 10 appropriately switches the layers of the moving image data used for frame rendering in accordance with the value of z of the frame coordinates.

Instead of the frame coordinates in the virtual space, the image processing device 10 may derive both information identifying a layer and the texture coordinates (UV coordinates) in the layer. Hereinafter, the combination of the information identifying a layer and the texture coordinates will be also referred to as frame coordinates.

The hierarchical data is compressed for each tile image and stored in a memory in the image processing device 10. Then, data necessary for frame rendering is read from the memory device and decoded. FIG. 3 conceptually shows hierarchical data and does not limit the storage order or the format of data stored in the memory device. For example, as far as the position of hierarchical data in a virtual space is mapped to an actual storage area of moving image data, the moving image data can be stored in an arbitrary area.

Figure 4:
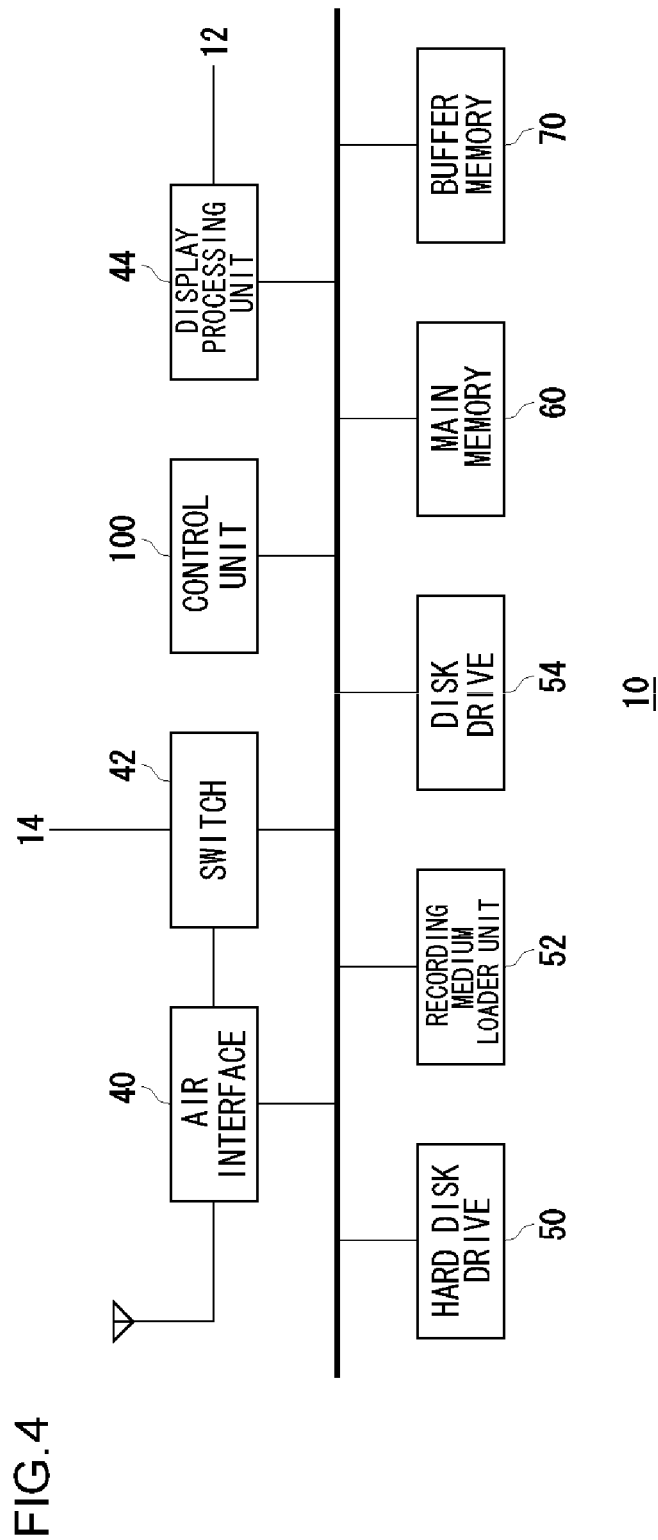
FIG. 4 shows the configuration of an image processing device according to the present embodiment.

FIG. 4 illustrates the configuration of the image processing device 10. The image processing device 10 comprises an air interface 40, a switch 42, a display processing unit 44, a hard disk drive 50, a recording medium loader unit 52, a disk drive 54, a main memory 60, a buffer memory 70, and a control unit 100. The display processing unit 44 is provided with a frame memory for buffering data to be displayed on the display of the display device 12.

The switch 42 is an Ethernet switch (Ethernet is a registered trademark), a device connected to an external device via a cable or wirelessly so as to transmit and receive data. The switch 42 is connected to an external network via the cable 14 so as to receive hierarchical data from an image server. The switch 42 is connected to the air interface 40. The air interface 40 is connected to the input device 20 using a predefined wireless communication protocol. A signal requesting to move a display area as input by the user via the input device 20 is supplied to the control unit 100 via the air interface 40 and the switch 42.

The hard disk drive 50 functions as a storage device for storing data. The moving image data may be stored in the hard disk drive 50. If a removable recording medium such as a memory card or the like is mounted, the recording medium loader unit 52 reads data from the removable recording medium.

When a read-only ROM disk is mounted, the disk drive 54 drives and recognizes the ROM disk so as to read data. The ROM disk may be an optical disk, a magneto-optical disk, or the like. The moving image data may be stored in the recording medium.

The control unit 100 is provided with a multicore CPU. One general-purpose processor core and a plurality of simple processor cores are provided in a single CPU. The general-purpose processor core is referred to as a power processor unit (PPU) and the other processor cores are referred to as synergistic-processor units (SPUs). The control unit 100 may be further provided with a graphics processing unit (GPU).

The control unit 100 is provided with a memory controller connected to the main memory 60 and the buffer memory 70. The PPU is provided with a register and a main processor as an entity that executes a computation. The PPU efficiently allocates tasks as basic units of processing in applications to the respective SPUs. The PPU itself may execute a task. The SPU is provided with a register, a subprocessor as an entity that executes a computation, and a local memory as a local storage area. The local memory may be used as the buffer memory 70.

The main memory 60 and the buffer memory 70 are storage devices and are formed as random access memories (RAMs). The SPU is provided with a dedicated direct memory access (DMA) controller and is capable of high-speed data transfer between the main memory 60 and the buffer memory 70. High-speed data transfer is also achieved between the frame memory in the display processing unit 44 and the buffer memory 70. The control unit 100 according to the embodiment implements high-speed image processing by operating a plurality of SPUs in parallel. The display processing unit 44 is connected to the display device 12 and outputs an image processing result in accordance with a user request.

The image processing device 10 sequentially loads, in advance, moving image data that is closely related in a spatial and temporal manner to a frame that is currently displayed from the hard disk drive 50 into the main memory 60 in order to smoothly perform enlargement/reduction or scrolling of a display image. Further, the image processing device 10 decodes a part of the moving image data loaded into the main memory 60 and stores the decoded data in the buffer memory 70 in advance. With this, a display area can be smoothly moved while allowing the play back of a moving image to progress. In this case, data to be loaded or decoded may be determined by predicting an area that will become necessary thereafter based on the earlier direction of movement of the display area.

In the hierarchical data shown in FIG. 3, the position in the Z axis direction indicates the resolution. The closer to the 0-th layer 30, the lower the resolution. The closer to the third layer 36 is, the higher the resolution is. In terms of the size of an image displayed on the display, the position in the z-axis direction represents the scale. Assuming that the scaling factor of the displayed image in the third layer 36 is 1, the scaling factor in the second layer 34 is $1/4$, the scaling factor in the first layer 32 is $1/16$, and the scaling factor in the 0-th layer 30 is $1/64$.

Therefore, if the display image changes in the z-axis direction away from the 0-th layer 30 toward the third layer 36, the displayed image is enlarged. If the displayed image changes in the direction away from the third layer 36 toward the 0-th layer 30, the displayed image is reduced. For example, when the scale factor of a display image is close to that of the second layer 34, the display image is generated by using the image data on the second layer 34.

More specifically, as described above, switching boundaries are provided to, e.g., respective intermediate scale factors of the layers. For example, if the scale factor of an image to be displayed is in between a switching boundary between the first layer 32 and the second layer 34 and a switching boundary between the second layer 34 and the third layer 36, the image data on the second layer 34 is used to render a frame. In this case, when the scale factor is in between the second layer 34 and the switching boundary between the first layer 32 and the second layer 34, the image frame of the second layer 34 is reduced for display. When the scale factor is in between the second layer 34 and the switching boundary between the second layer 34 and the third layer 36, the image frame of the second layer 34 is enlarged for display.

Meanwhile, when identifying and decoding an area that will become necessary in the future, which is predicted by a signal requesting to move a display area, the scale factor of each layer or the like is set as a prefetch boundary in advance. For example, when the reduction scale requested by the signal requesting to move the display area exceeds the scale factor of the second layer 34, the image processing device 10 prefetches at least a part of the image data on the first layer 32 located in the direction of reduction from the hard disk drive 50 or the main memory 60, decodes the prefetched image data, and writes the decoded image data in the buffer memory 70.

The same applies to an image prefetch process in the upward, downward, leftward, or rightward direction. More specifically, a prefetch boundary is set in the image data developed in the buffer memory 70 in advance so that, when a display position indicated by a signal requesting to move the display area exceeds the prefetch boundary, the prefetch process is started. With this, a mode can be realized where moving-image reproduction is progressed while smoothly changing the resolution and the display position in accordance with a request for moving the display area from the user.

Figure 5:
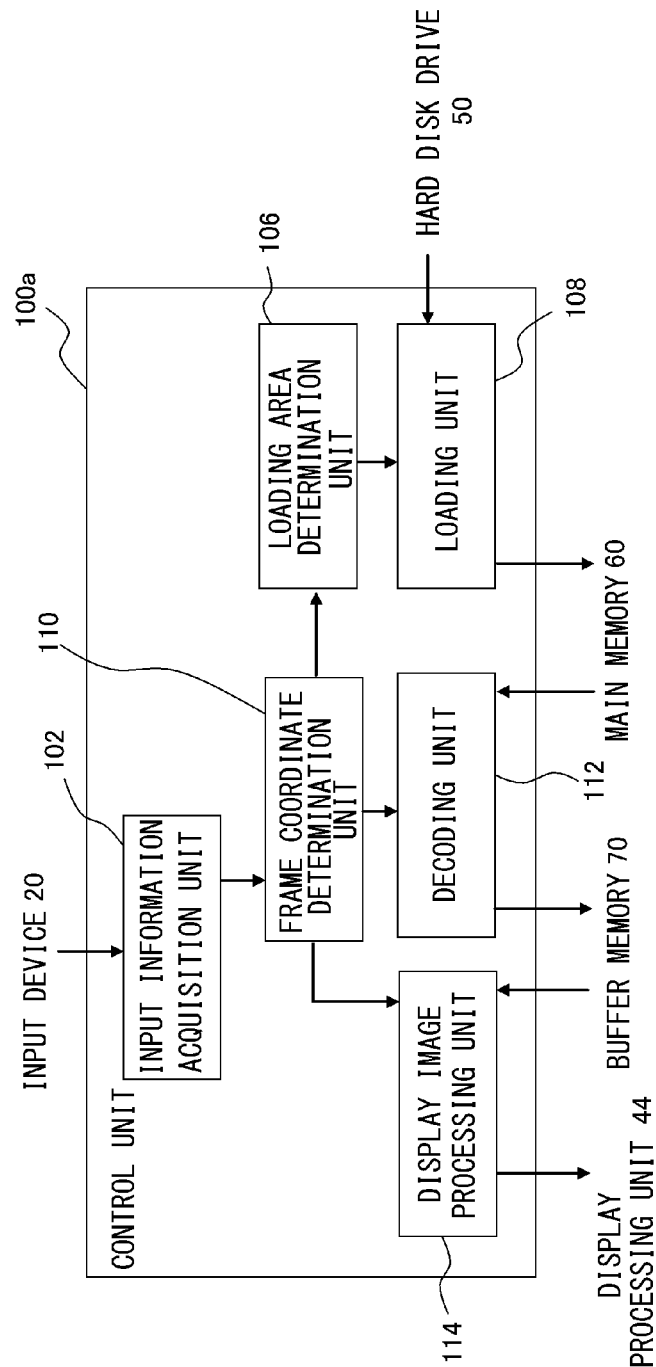
FIG. 5 shows in detail the configuration of a control unit having a function of displaying a moving image using moving image data having a hierarchical structure in accordance with the present embodiment.

FIG. 5 illustrates, in detail, the configuration of a control unit 100a having a function of displaying a moving image using moving image data having a hierarchical structure in the present embodiment. The control unit 100a comprises an input information acquisition unit 102 for acquiring information entered by the user via the input device 20, a frame coordinate determination unit 110 for determining the frame coordinates of an area to be newly displayed, a loading area determination unit 106 for determining compressed data on a moving image stream to be newly loaded, and a loading unit 108 for loading a necessary moving image stream from the hard disk drive 50. The control unit 100a further comprises a decoding unit 112 for decoding compressed data on a moving image stream and a display image processing unit 114 for rendering an image frame.

Figure 15:
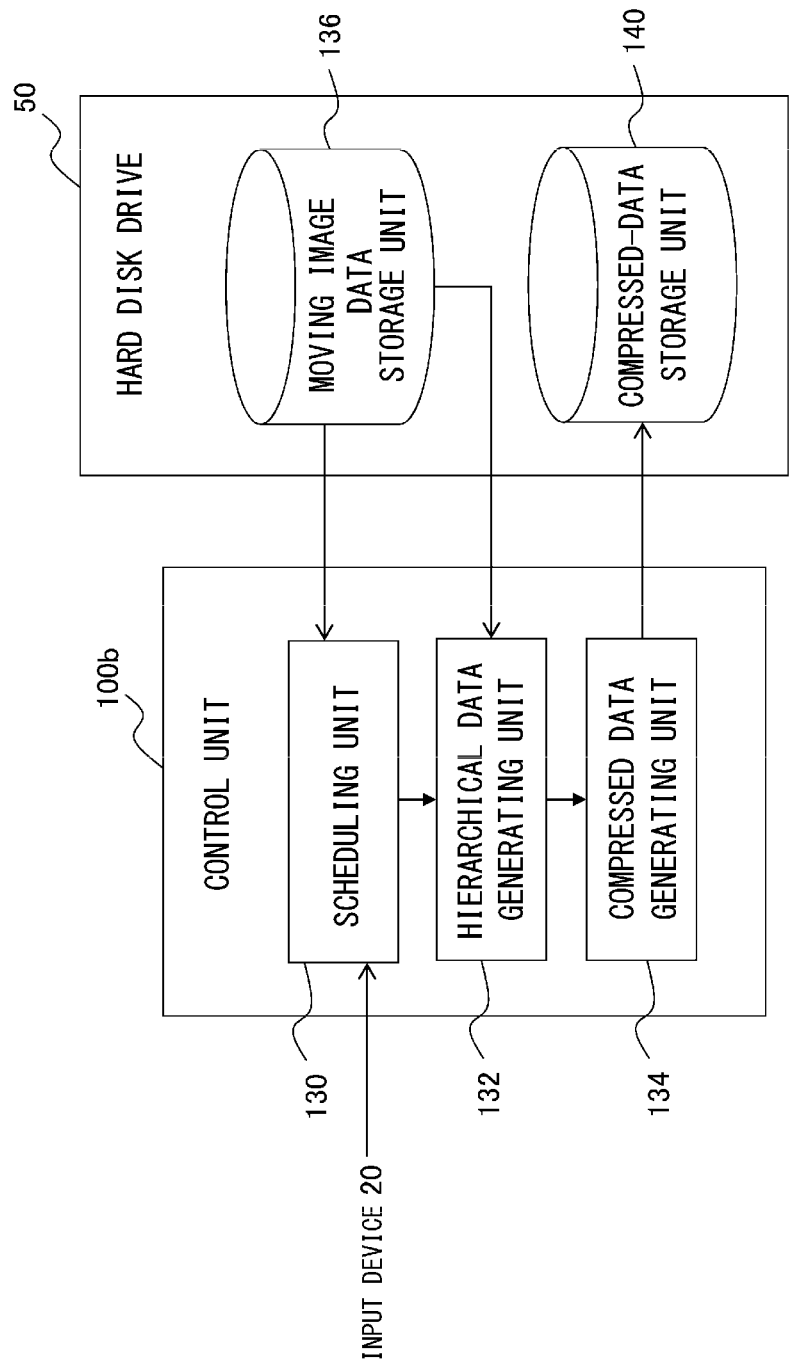
FIG. 15 shows the detailed configuration of a control unit provided with a compressed moving image data generating function and a hard disk drive in accordance with the present embodiment.

In FIG. 5 and FIG. 15 described later, the elements shown in functional blocks that indicate a variety of processes are implemented in hardware by any Central Processing Unit (CPU), memory, or other LSI's, and in software by a program loaded in memory, etc. As stated previously, the control unit 100 has one PPU and a plurality of SPUs, and functional blocks can be formed by a PPU only, a SPU only, or the cooperation of both. Therefore, it will be obvious to those skilled in the art that the functional blocks may be implemented in a variety of manners by a combination of hardware and software. Therefore, it will be obvious to those skilled in the art that the functional blocks may be implemented in a variety of ways, by hardware only, software only, or a combination thereof.

The input information acquisition unit 102 acquires a request entered by the user via the input device 20 to start/terminate moving-image reproduction, move the display area, etc., and notifies the frame coordinate determination unit 110 of the request. The frame coordinate determination unit 110 determines the frame coordinates of an area to be newly displayed in accordance with the frame coordinates of the current display area and a signal requesting to move the display area entered by the user and notifies the loading area determination unit 106, the decoding unit 112, and the display image processing unit 114 of the determined frame coordinates.

Based on the frame coordinates notified by the frame coordinate determination unit 110, the loading area determination unit 106 specifies moving image data to be newly loaded from the hard disk drive 50 and issues a load request to the loading unit 108. As described above, according to the embodiment, a series of frames of each layer is formed into one or more independent moving image streams for each tile image. As a result, basically, moving image streams of which the number is that of tile images for each layer are formed. Alternatively, data indicating a same area of a plurality of layers, or a plurality of tile images may coexist in one moving image stream, as will be described later.

Information that associates an identification number indicating the layer and the position of a tile image and an identification number of moving image stream data itself with each other is attached to the moving image data in advance, and the information is loaded into the main memory 60 when the playback of the moving image is started. Based on frame coordinates, the loading area determination unit 106 refers to the information and acquires the identification number of a moving image stream of a necessary area. If data on the corresponding moving image stream has not been loaded yet, the loading area determination unit 106 issues a load request to the loading unit 108. Even if the frame coordinates do not change, the loading area determination unit 106 requests sequentially in accordance with the progression of the moving image, that data on a necessary moving image stream be loaded. A moving image stream may be divided temporally into sub streams in advance, and may be loaded on sub stream by sub stream basis.

In addition to a moving image stream that is necessary to render a frame at the moment, the loading area determination unit 106 may specify a moving image stream that is expected to be required later by a prefetch process described before or the like, and may issue a load request to the loading unit 108. In accordance with the request issued by the loading area determination unit 106, the loading unit 108 performs a loading process of a moving image stream from the hard disk drive 50. More specifically, the loading unit 108 identifies, from an identification number of a moving image stream to be loaded, a storage area in the hard disk drive 50 and stores data read out from the storage area into the main memory 60.

Based on frame coordinates at each point in time, the decoding unit 112 reads out the data on the necessary moving image stream from the main memory 60, decodes the data that has been read, and sequentially stores the decoded data in the buffer memory 70. A decoding target may be in units of moving image streams. When an area defined by frame coordinates determined by the frame coordinate determination unit 110 is located across a plurality of moving image streams, the decoding unit 112 decodes the plurality of moving image streams.

According to the embodiment, the data size of hierarchical data is reduced by retaining data on one or more layers of the hierarchical data as a difference image that represents a difference value between the portion and an enlarged image of an image on a layer higher than that of the portion, as will be described later. Therefore, if a decoded image is a difference image, the decoding unit 112 further decodes an image on a higher layer that was used when generating the difference image, enlarges the image on the higher layer, and adds the image on the higher layer to the decoded difference image, so as to restore an original image data and to store the original image data into the buffer memory 70. Based on frame coordinates at each time point, the display image processing unit 114 reads out corresponding data from the buffer memory 70, and renders the data in a frame memory of the display processing unit 44.

In an embodiment where the movement of a display area including enlargement/reduction is allowed while one moving image is played back, it is desirable that all of the moving image streams share a common time axis, and that frame rendering proceeds seamlessly regardless of whether or not a moving image stream to be used is switched to another stream. Therefore, as described above, an area required for displaying at a time and/or a moving image stream expected to be required thereafter are loaded and decoded with a high priority so that the efficiency of processing required by the time of frame rendering is improved. Further, as will be described later, by configuring a moving image stream as appropriate, displaying of a frame is started with low latency regardless of when a moving image stream to be used for displaying is switched to another stream.

With the configuration described above, an entire image can be overlooked, a part of the image can be enlarged, etc freely and smoothly even for a large sized moving image, for example, a moving image of which one frame is of the order of giga pixels. Further, by preparing a moving image in a hierarchical structure, a moving image can be displayed with a similar appearance regardless of a display device, by selecting an appropriate layer in accordance with the resolution and/or the size of a display, the processing capability of a device, etc.

With respect to images at a same time point of different layers included in hierarchical data on a moving image, the contents thereof are same although the resolutions thereof are different. Thus the hierarchical data always has redundancy among layers by its nature. Therefore in accordance with the embodiment, as described above, one or more layers of the hierarchical data is configured as a difference image between the layer and an enlarged image of an image on a layer higher than the layer. Considering the nature of the hierarchical data described above, the data size thereof can be significantly reduced by utilizing a difference between layers.

Figure 6:
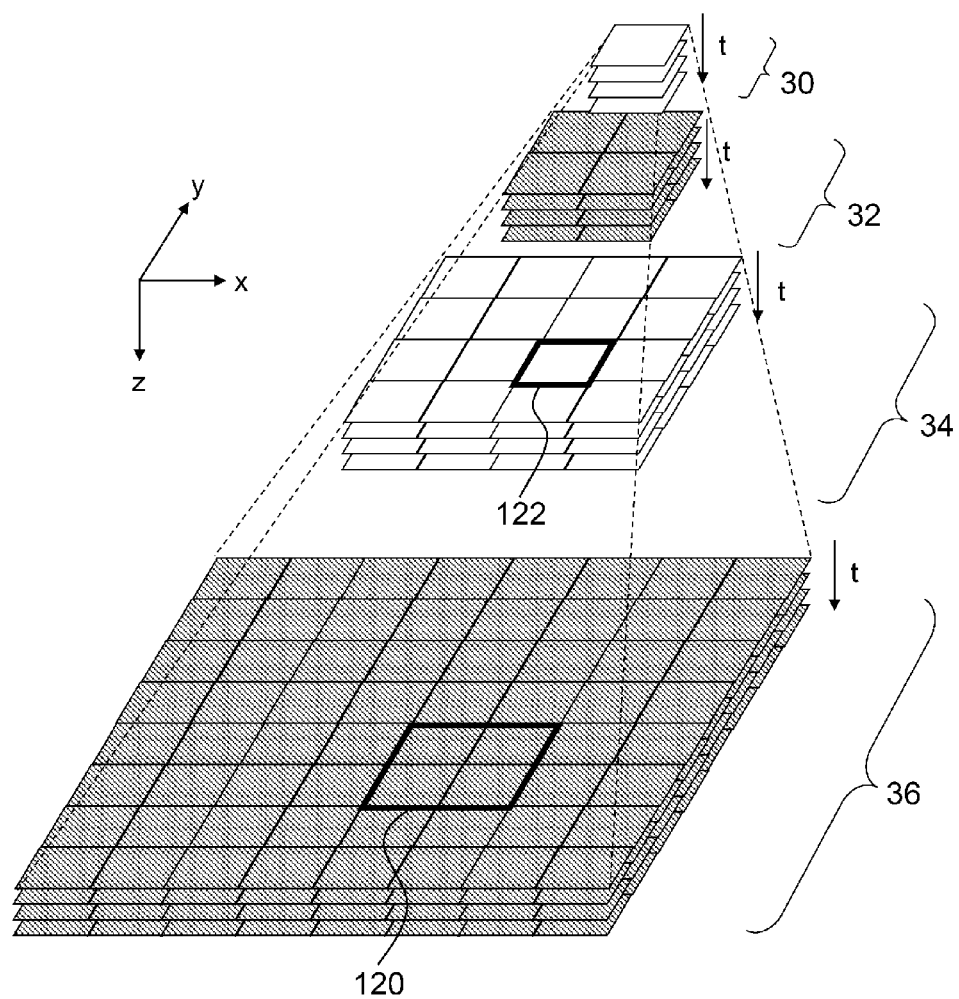
FIG. 6 schematically shows a status where some layers of moving image data having a hierarchical structure are represented by difference images in accordance with the present embodiment.

FIG. 6 schematically shows a state where some layers of moving image data having a hierarchical structure are represented by difference images. In the example shown in the figure, the 0-th layer 30 and the second layer 34 retain original image data, and the first layer 32 and the third layer 36 retain data on a difference image. Original data is shown by an outlined white portion and data on a difference image is shown by a hatched portion. In the following explanation, a layer that retains original image data is referred to as an "original image layer" and a layer that retains data on a difference image is referred to as a "difference image layer."

In the case that an area 120 is to be displayed with the resolution of the third layer 36, an image of a corresponding area 122 retained by the second layer 34 after enlarged to the resolution of the third layer 36 is added to the difference image of the area 120 retained by the third layer 36, pixel by pixel. In the case shown in the figure, since the resolution of the third layer 36 is 2×2 times that of the second layer 34, the image of the area 122 is enlarged to 2×2 times. For enlargement, a commonly-used interpolation method, such as a nearest neighbor method, a Bilinear method, a Bicubic method, etc., may be adopted.

By configuring data in this manner, the total data size can be reduced. In addition, a necessary band width for a transmission path on which data passes by the time the data is displayed (i.e., an internal bus in the image processing device 10, a network connected to an image server, etc) can be restricted. This is because, in comparison with the data size of an original image in a desired resolution with which the original image is intended to be displayed, the data size of the sum of data on a difference image in the desired resolution and data on the original image on a layer where the resolution is lower than the desired resolution is smaller.

In the example shown in FIG. 6. the allocation of an original image layers and a difference image layers is fixed. In this case, the bit rate is low when displaying an image with the resolution of a difference image layer. Thus the band width required for the transmission of data can be cut down. Meanwhile, in a period during which an image is displayed with the resolution of an original image layer, the bit rate is as same as that of the case where a difference image layer is not provided. Thus the effect of bandwidth reduction cannot be obtained. In order to display an image smoothly and constantly with any resolutions of any layers, it is required to reserve a bandwidth conforming to a maximum bit rate. Therefore, such an embodiment hardly leads to the reduction of a bandwidth to be reserved.

Figure 7:
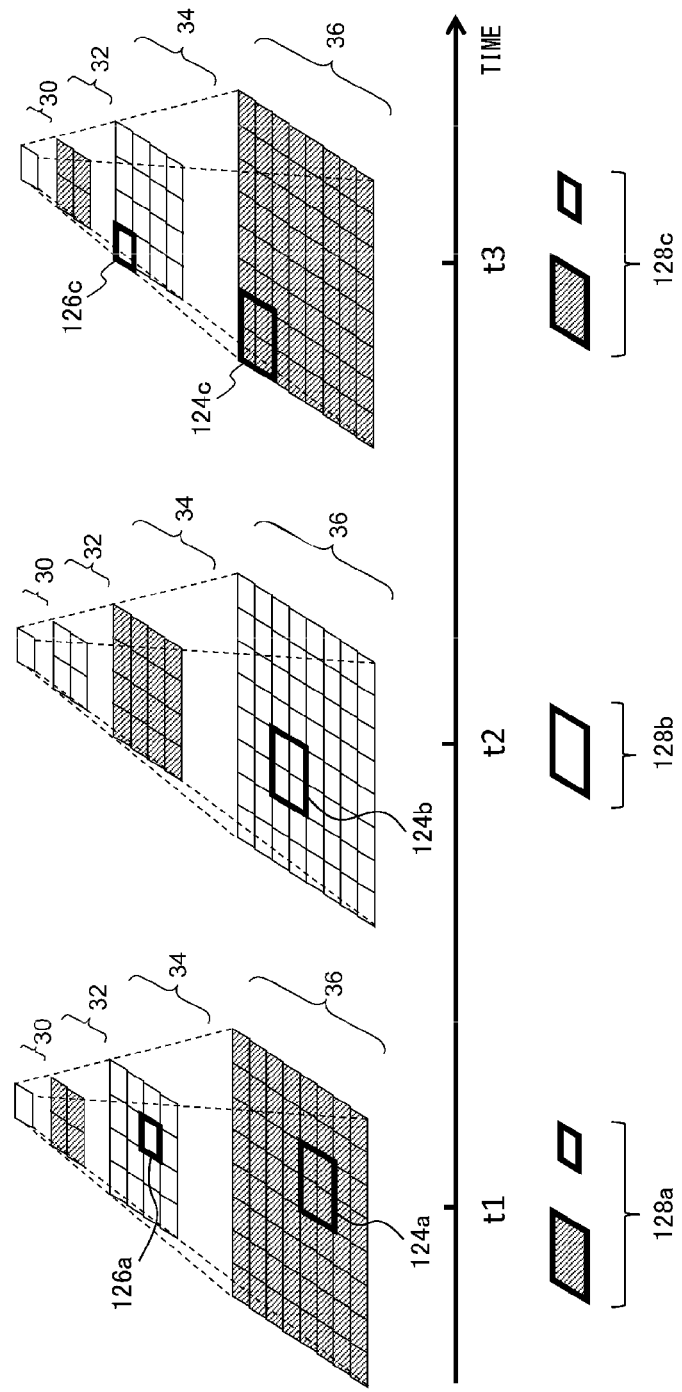
FIG. 7 shows a diagram for illustrating an exemplary embodiment where allocation of an original image layer and a difference image layer is switched among some allocation patterns according to the present embodiment.

Therefore, by switching the allocation of an original image layer and a difference image layer to another allocation pattern in accordance with a predetermined rule, the bit rate is averaged, the transmission data size is restricted in terms of the period longer than the switching period, and a bandwidth required for the transmission can be reduced. FIG. 7 shows a diagram for illustrating an embodiment where allocation of an original image layer and a difference image layer is switched among some allocation patterns. In the figure, the horizontal axis indicates the time axis on a moving image. The figure shows the configurations of hierarchical data composed only of respective frames at time points t1, t2, and t3, respectively.

First, in the hierarchical data that represents frames at time t1, the 0-th layer 30 and the second layer 34 are set as an original image layer, and the first layer 32 and the third layer 36 are set as a difference image layer. In this case, an image with the resolution of the first layer 32 can be obtained by calculating the addition of a difference image of the first layer 32 and an original image of the 0-th layer 30. An image with the resolution of the third layer 36 can be obtained by calculating the addition of a difference image of the third layer 36 and an original image of the second layer 34.

In the hierarchical data that represents frames at time t2, which is later than the time t1, the 0-th layer 30, the first layer 32 and the third layer 36 are set as an original image layer, and the second layer 34 is set as a difference image layer. In this case, an image with the resolution of the second layer 34 can be obtained by calculating the addition of a difference image of the second layer 34 and an original image of the first layer 32. For the hierarchical data that represents frames at time t3, which is further later, the allocation is as same as the allocation pattern at time t1.

For example in the case that an area 124a is to be displayed with the resolution of the third layer 36 among the frames at time t1, data on the difference image of the area 124a and image data on a corresponding area 126a included in an original image of the second layer 34 are required. It is assumed that the display area moves with the proceeding of frames as time passes, and an area 124b is to be displayed with the resolution of the third layer 36, among the frames at time t2. In this case, since the third layer 36 is data on an original image, data on the area 124b alone is required. As time passes further and in the case that an area 124c is to be displayed with the resolution of the third layer 36 among the frames at time t3, data on a difference image of the area 124c, and image data on a corresponding area 126c included in an original image of the second layer 34 is required.

As a result, as shown at the bottom of the figure, in order to display the area 124a, the area 124b, and the area 124c with the resolution of the third layer 36 among the frames at time t1, t2, and t3, respectively, data 128a, data 128b, and data 128c is read out sequentially. The data 128a is a set of a difference image of the third layer 36 and an original image of the second layer 34. The data 128b is data on an original image of the third layer 36. The data 128c is a set of a difference image of the third layer 36 and an original image of the second layer 34.

In this manner, the configuration where an original image layer and a difference image layer are switched temporally reduces the possibility that large sized data, such as data 128b on an original image, is transmitted continuously. Thus the size of data to be transmitted per a unit of time (i.e., a bit rate) can be reduced. In order to facilitate an understanding, a target to be displayed is fixed to the resolution of the third layer 36 in the figure. However, even if the target layer for displaying is changed to another layer in the middle, a similar effect can be obtained.

FIGS. 8 to 11 show examples of a schedule for the allocation of an original image layer and a difference image layer. In these figures, the horizontal axis represents the passage of time, and changes of the allocation with time in hierarchical data of which the 0-th layer, the first layer, the second layer, . . . , are represented by "Lv0," "Lv1," "Lv2," . . . , respectively, are represented with a white rectangle for a period of original image layer, and with a hatched rectangle for a period of difference image layer. In a period represented by one rectangle, one or more frames are displayed.

Figure 8:
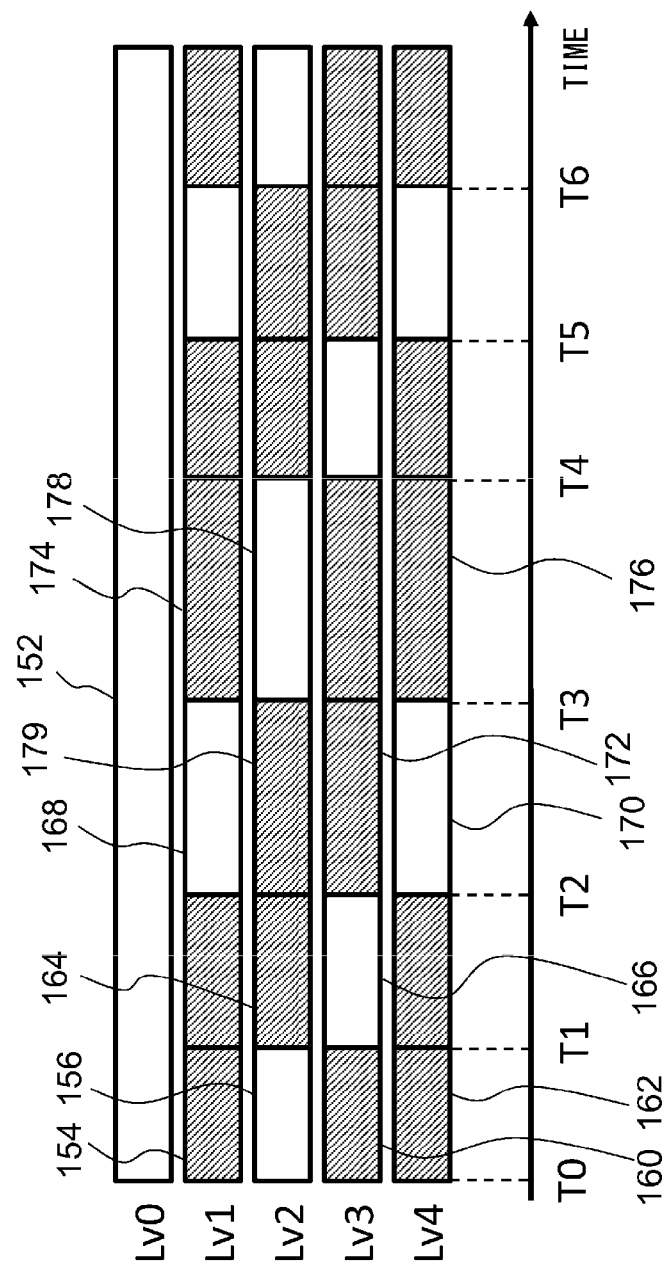
FIG. 8 shows an example of a schedule for the allocation of an original image layer and a difference image layer in accordance with the present embodiment.

FIG. 8 shows a case where time points for switching the allocation are shared across the entire hierarchical data. The 0-th layer is constantly set as an original image layer 152 since no layer exists above the 0-th layer. The same applies to the following examples. In the example shown in FIG. 8, an allocation of layers is switched at one or more layers at time points T0, T1, T2, T3, T4, T5, and T6. For example, during the period from time point T0 to T1, the 0-th layer Lv0 and the second layer Lv2 are set as original image layers 152 and 156, and a first layer Lv1, a third layer Lv3, and a fourth layer Lv4 are set as difference image layers 154, 160, and 162, among which the second layer Lv2 is switched to a difference image layer 164, and the third layer Lv3 is switched to an original image layer 166 at time T1.

At time T2, the first layer Lv1 and the fourth layer Lv4 are switched to an original image layers 168 and 170, respectively, and the third layer Lv3 is switched to a difference image layer 172. At time T3, the first layer Lv1 and the fourth layer Lv4 are switched to difference images 174 and 176, respectively, and the second layer Lv2 is switched to an original image layer 178. Such switches are repeated also thereafter. Then, except for the 0-th layer Lv0, an original image layer is switched from the first layer Lv1→the second layer Lv2→the third layer Lv3→the fourth layer Lv4, and layers other than that are set as a difference image layer.

In an embodiment shown in the FIG. 8, the number and arrangement of layers that are set as an original image layer concurrently, and the number and arrangement of layers that are set as a difference image concurrently are not limited to the number and arrangement shown in the figure, but any number and arrangement can be adopted as far as a combination of a layer that is set as an original image layer and a layer that is set as a difference image layer is changed at a time point common to all layers. In the example shown in FIG. 8, difference image layers are set to vertically-consecutive layers at any period. For example, during the period from time T2 to time T3, the second layer Lv2 and the third layer Lv3, which are vertically consecutive, are set as difference image layers 179 and 172.

In the case of such an allocation, where more than one consecutive layers are set as difference image layers concurrently, a differential image may be generated by a subtraction from a layer directly above, or may be generated by a search for an original image and a subtraction from the original image. In the former case, a difference image obtained from a difference image is retained unless a layer that is directly above is an original image layer. Therefore, the lower the layer is located with respect to an original image layer, the more number of layers and more addition processes are required in order to restore an image. However, the data size becomes smaller.

In the latter case, the number of layers and the amount of addition processes required to restore an image stay constant. However, the lower the layer is located with respect to an original image layer, the larger a difference value is. Therefore the size of data is larger in comparison with that of the former case. Which of the difference image is to be adopted is determined considering the content of a moving image, processing capability of a display device, an available transmission band, etc. Alternatively, the schedule may be determined so that difference image layers are not allocated to consecutive layers.

The time points T0-T6 for the switches may be set at regular intervals. In this case, a switch is made for each predetermined number of frames (e.g., for each eight frames) at least at one of the layers. In this case, a difference image layer can be determined for each frame in advance. Therefore, when displaying a moving image, a layer that is required for rendering can be easily specified, and/or whether or not an addition process is required can be easily determined, so that control can be simplified.

Alternatively, at least one of the switching time points may be determined based on the characteristics of an moving image. For example, a time point when scenes are changed is identified by referring to scene change information embedded in an moving image, and a switch is made at a time point between a frame before the scene change and a frame after the scene change. Instead of the scene change information, a switch may be made at a time point between frames having a large difference therebetween. As will be described later, in the case that frames are configured to have dependency with each other by compression encoding such as inter-predictive coding or the like, it is convenient to make a switch between frames having low temporal redundancy.

Alternatively, a time point when to switch layers may be determined in accordance with the accumulated amount of data size. That is, at one of the layers other than the 0-th layer Lv0, the next switching time point is determined as a time point when the accumulated amount of data size of frames after the present switch reaches a predetermined threshold value. Although the size of an image differs depending on the layers, data actually transmitted is a similar number of tile images regardless of layers. Therefore, the data size used for the calculation of accumulated amount is assumed to be a value converted to a value per unit area (e.g., a value per the area of a tile image, or the like). In this case, since the data size of a difference image is small, the switching time points are substantially determined by the data size of an original image retained by one or more original image layers. By determining the switching time points on the basis of an actual data size in this manner, high bit rate transmission of data can be dispersed effectively.

That is, determining the switching time points in this manner exactly corresponds to setting a higher switching frequency as the bit rate of an original image increases. Since continual high bit rate data transmission results in a continuous busy status where almost no extra band is available, a broad band width is required in order to perform constant smooth transmission as a result. By switching more frequently for a higher bit rate image as described above, a bandwidth margin is constantly provided, and high bit rate data is transmitted by using the bandwidth margin.

For an image, of which the bit rate is not so high and for which a bandwidth does not easily become tight even in the case that data on its original image is transmitted, a frequency of switching of processes when displaying an image is reduced by reducing a switching frequency, which leads to easier control. With this, a bandwidth required for data transmission can be reduced more directly and effectively.

Figure 9:
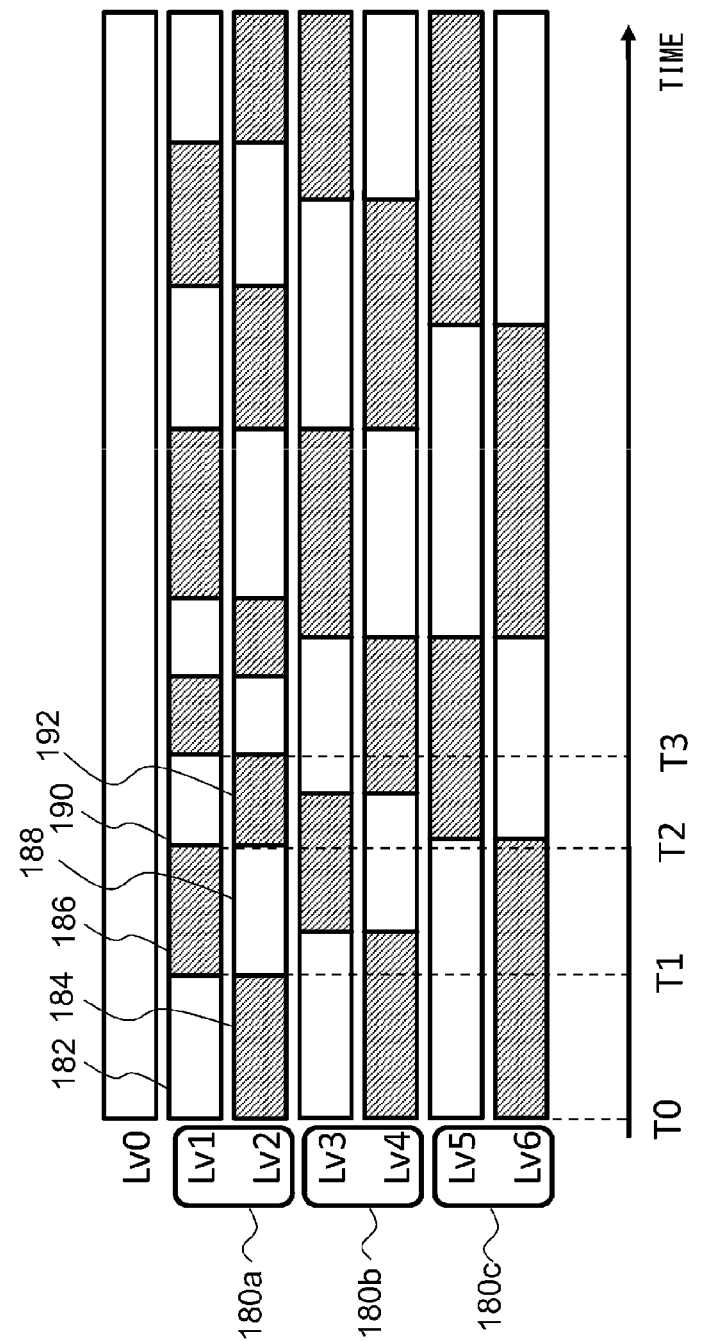
FIG. 9 shows an example of a schedule for the allocation of an original image layer and a difference image layer in accordance with the present embodiment.

FIG. 9 shows a case where time points for switching are shared in each group generated by partitioning layers of hierarchical data. In the example shown in the figure, two vertically-consecutive layers (i.e., the first layer Lv1 and the second layer Lv2, the third layer Lv3 and the fourth layer Lv4, and the fifth layer Lv5 and the sixth layer Lv6) are collected as one group (groups 180a, 180b, and 180c), respectively. Time points for switching are shared by layers in a group. An original image layer and a difference image layer are allocated to two layers that belong to a group, alternately.

At each switching time point, an original image layer and a difference image layer are switched. For example, in the group 180a, during a period between time T0 to time T1, the first layer Lv1 is the original image layer 182, and the second layer Lv2 is the difference image layer 184. In contrast, during a period between time T1 to time T2, the first layer Lv1 is the difference image layer 186 and the second layer Lv2 is the original image layer 188. Further, during a period between time T2 to time T3, the first layer Lv1 is the original image layer 190 and the second layer Lv2 is the difference image layer 192. The same applies to other groups 180b and 180c. However, switching time points may differ for each group. With this, an original image layer that is required in order to restore an original image from a difference image exists in a group directly above at any period without fail.

In the example shown in the figure, two layers are put into one group. Therefore, an original image layer that is required in order to restore an original image from a difference image exists on a second upper layer at a maximum. In this manner, by limiting the number of layers from a difference image layer to an original image layer, a load due to a process of accessing data required to restore an original image and/or an addition process of images can be reduced.

Switching time points at each group may be determined by selecting one of the rules explained by FIG. 8 for each group. For example, switching time points may be determined in accordance with an accumulated amount of a data size for each group. In this case, the data size per unit area has a tendency that the smaller an image is reduced, the larger the data size is. Therefore, the higher a group is positioned in the hierarchy, the earlier, the accumulated amount of the data size reaches a threshold value.

Therefore, as shown in FIG. 9, the switching frequency of the group 180a of the first layer Lv1 and the second layer Lv2 is the highest, then the group 180b of the third layer Lv3 and the fourth layer Lv4 follows, and then the group 180c of the fifth layer Lv5 and the sixth layer Lv6 follows, i.e., the switching frequencies of a group of lower layers becomes lower. By setting respective switching time points minutely while taking characteristics of respective layers into account, a necessary bandwidth can be reduced more effectively with a similar principle to that explained with FIG. 8.

A threshold value for the accumulated amount of data size can be changed for each group. For example, sometimes a bit rate for a specific layer is set higher than that of other layers depending on the content of a moving image at the time of compression encoding. The specific layer is, for example, a layer that is expected to be used for displaying at a higher frequency than other layers, a layer specified by a user, or the like. In this case, if a threshold value of a group including the specific layer is set as a smaller value in accordance with a bit rate to be set, the switching frequency can be adjusted according to a bit rate of data to be transmitted in practice.

Figure 10:
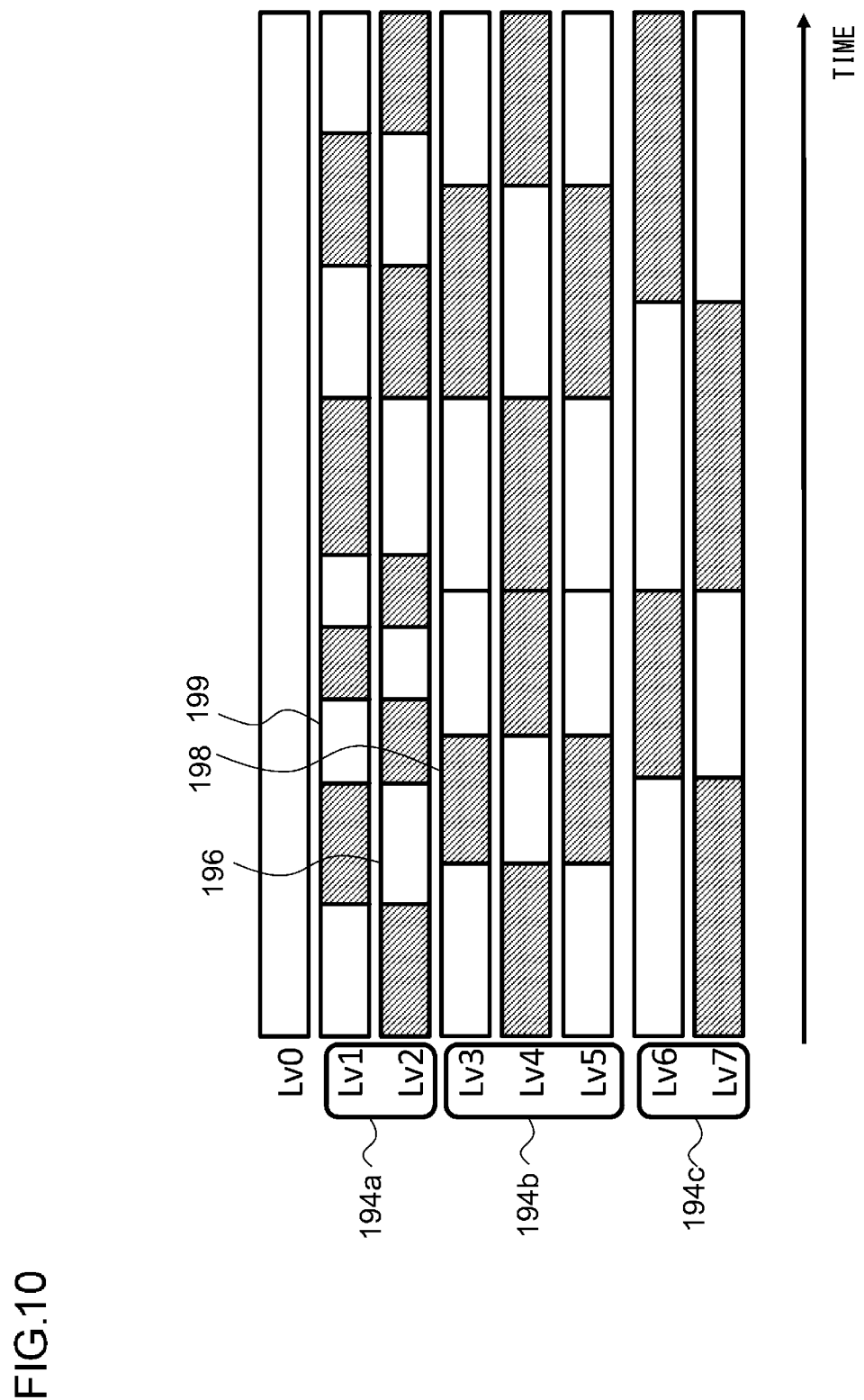
FIG. 10 shows another example of a schedule for the allocation of an original image layer and a difference image layer in accordance with the present embodiment.

FIG. 10 shows another example of a case where time points for switching are shared in each group generated by partitioning layers of hierarchical data. In the example shown in the figure: the first layer Lv1 and the second layer Lv2; the third layer Lv3, the fourth layer Lv4, and the fifth layer Lv5; and the sixth layer Lv6 and the seventh layer Lv7 are put into a group (groups 194a, 194b, and 104c), respectively. The number of layers belonging to one group differs for each group. Also in this case, switching time points are determined for each group in a similar manner to that shown in FIG. 9.

A schedule for the allocation is determined appropriately so that the number of layers from a difference image layer (e.g., a difference image layer 198) to an original image layer (e.g., an original image layer 196 or 199) can be restricted even if more than two layers belong to a group. More specifically, the number of consecutive layers set as difference image layers in the group around the same time is limited to 2N at a maximum. Further, if the number of consecutive layers set as difference image layers counted from the boarder of the groups around the same time is limited to N at a maximum, the number of consecutive layers set as difference image layers around the same time is limited to 2N at a maximum, even considering two groups sandwiching the boarder.

For example in the case of FIG. 10, it does not happen that a plurality of consecutive layers are set as difference image layers around the same time in a group. Further, it does not happen that a plurality of consecutive layers counted from a boarder of the groups are set as difference image layers around the same time. That is, N=1. With this, the number of consecutive layers set as difference image layers is 2N=2 at a maximum even in the entire hierarchical data. The maximum value 2N of the number of layers from a difference image layer to an original image layer has an influence on a processing load in a display device as described above. Therefore, 2N is determined in accordance with the processing capability of the display device, and in accordance therewith, the allocation is scheduled.

Figure 11:
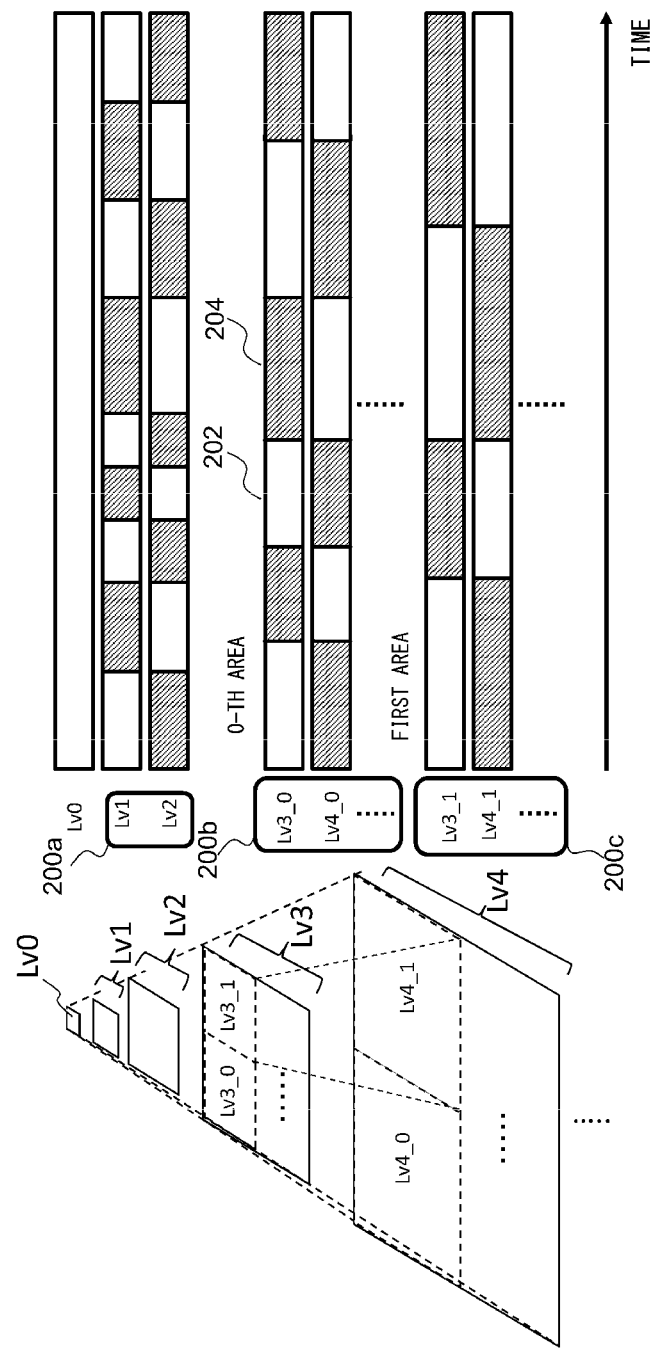
FIG. 11 shows another example of a schedule for the allocation of an original image layer and a difference image layer in accordance with the present embodiment.

FIG. 11 shows the case where groups, each of which including a plurality of layers and which are generated in accordance with embodiments shown in FIGS. 9 and 10, are further grouped for each area on an image. That is, images on the plurality of layers are divided at a same position on the images and a group is formed for each area representing a same portion. In the example shown in the figure, an image on the third layer Lv3 is divided into areas Lv3_0, Lv3_1, . . . , etc., and an image on the fourth layer Lv4 is divided into areas Lv4_0, Lv4_1, . . . , etc.

The area Lv3_0 of the third layer Lv3 and the area Lv4_0 of the fourth layer Lv4, the areas representing a same region on images, are referred to as a 0-th area, and the area Lv3_1 of the third layer Lv3 and the area Lv4_1 of the fourth layer Lv4, representing a same region on images, are referred to as a first area. Groups (groups 200b and 200c) are formed for each area (i.e., the 0-th areas in the third layer Lv3 and the fourth layer Lv4, the first areas in the third layer Lv3 and the fourth layer Lv4, etc), and time points for switching are shared in a group.

In this manner, groups into which a plurality of layers are collected for each area are generated for the entire image. Although only the third layer Lv3 and the fourth layer Lv4 are shown as a target layer to be divided in the figure, more than two layers may belong to one group. Switching time points in each group may be determined by selecting a rule for each group in a similar manner to that shown in FIG. 9. For each group, at a determined switching time point, an area of at least one of the layers in a group is switched between an original image layer and a difference image layer (e.g., from an original image layer 202 to a difference image layer 204).

For example, switching time points may be determined for each group in accordance with an accumulated amount of data size. Even for one image, if complexity of the image differs depending on areas, the bit rate thereof also differs. For example an area for the blue sky, which is almost solid color, and an area for a boulevard where cars come and go, have a difference in the bit rate. As described above, it is preferable to switch the allocation at higher frequency for an area having a high bit rate. As a result, appropriate switching frequencies differ depending on areas. Therefore, by determining switching time points for each area, an adjustment at a more detailed level can be made, and the band width to be used can be reduced with a condition according to the content of an image.

In a similar manner to that explained in FIG. 9, a threshold value that is set with respect to the accumulated amount of data size may be determined so as to differ for each group. From the view point of adjusting switching time points while considering the difference of bit rates among areas because of the difference, a layer for which grouping for respective areas are performed, is set as a layer of relatively high resolution with which bit rates tend to differ among tile images. That is, one group 200a may be formed without division into areas as shown in FIG. 11 for a low resolution image such as, the 0-th layer Lv0, the first layer Lv1, the second layer Lv2, etc. In this case, the 0-th area and the first area, which are defined as individual groups 200b and 200c in the third layer Lv3 and the fourth layer Lv4 respectively are integrated into one group in the second layer Lv2. Alternatively, grouping for each area maybe performed for all the layers except the 0-th layer Lv0 depending on the contents of an image.

Also in this embodiment, as explained in FIG. 10, the allowable upper limit 2N of the number of consecutive layers set as difference image layers around the same time is determined based on the processing capability of the display device. Then a schedule for the allocation is adjusted so that the number of consecutive layers, which are set as difference image layers around the same time, the number being counted from the boarder of the groups having a vertical relation (e.g., the boarder where divided areas are integrated as described above, or the like), becomes N at a maximum.

As described above, according to the embodiment, compression encoding is performed for each area (e.g., for each tile image, etc.) so as to form independent moving image streams. When displaying, only a moving image stream including a display area is decoded individually and connected as a display image, by which, each frame of a moving image is rendered. By allowing random access in the time direction of the moving image stream, that is, by allowing playback to be started at any time for any of the moving image streams, a display area can be moved arbitrarily with respect to the moving image.

Figure 12:
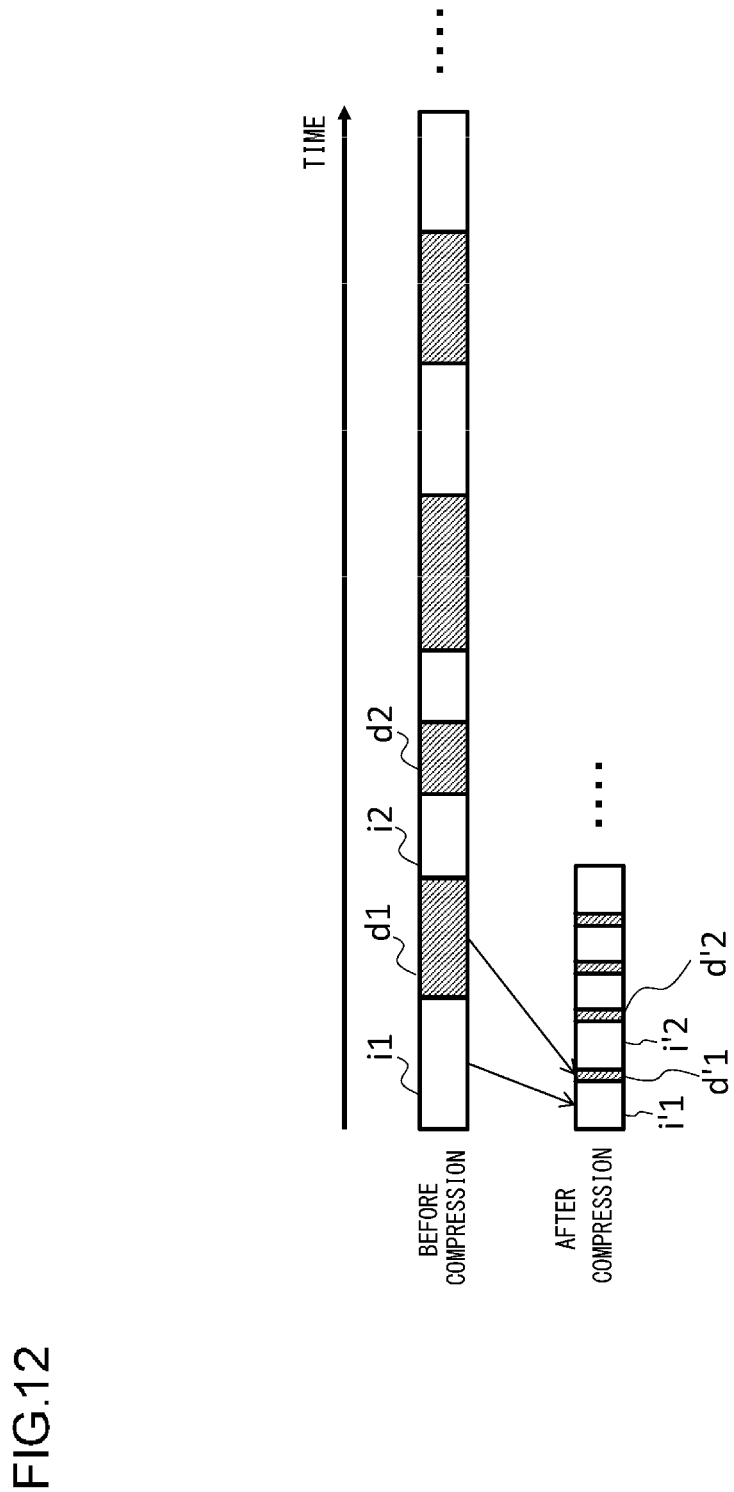
FIG. 12 shows a configuration of a moving image stream in the case that the order of moving image frames is adopted without change as the data order of a moving image stream in accordance with the present embodiment.
Figure 13:
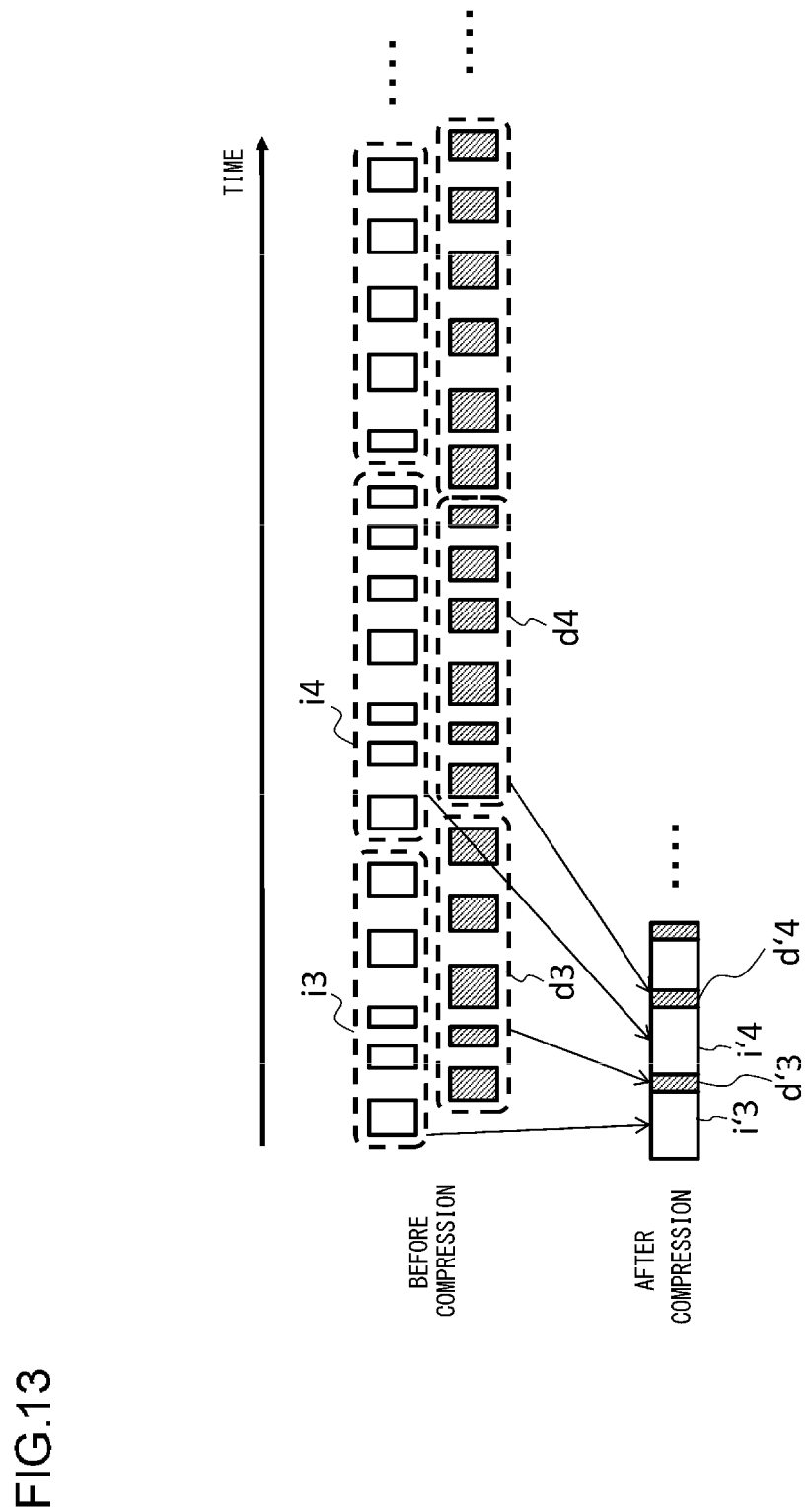
FIG. 13 shows a configuration of a moving image stream in the case that same types of frame data are extracted from a series of frames, grouped and compressed according to the present embodiment.
Figure 14:
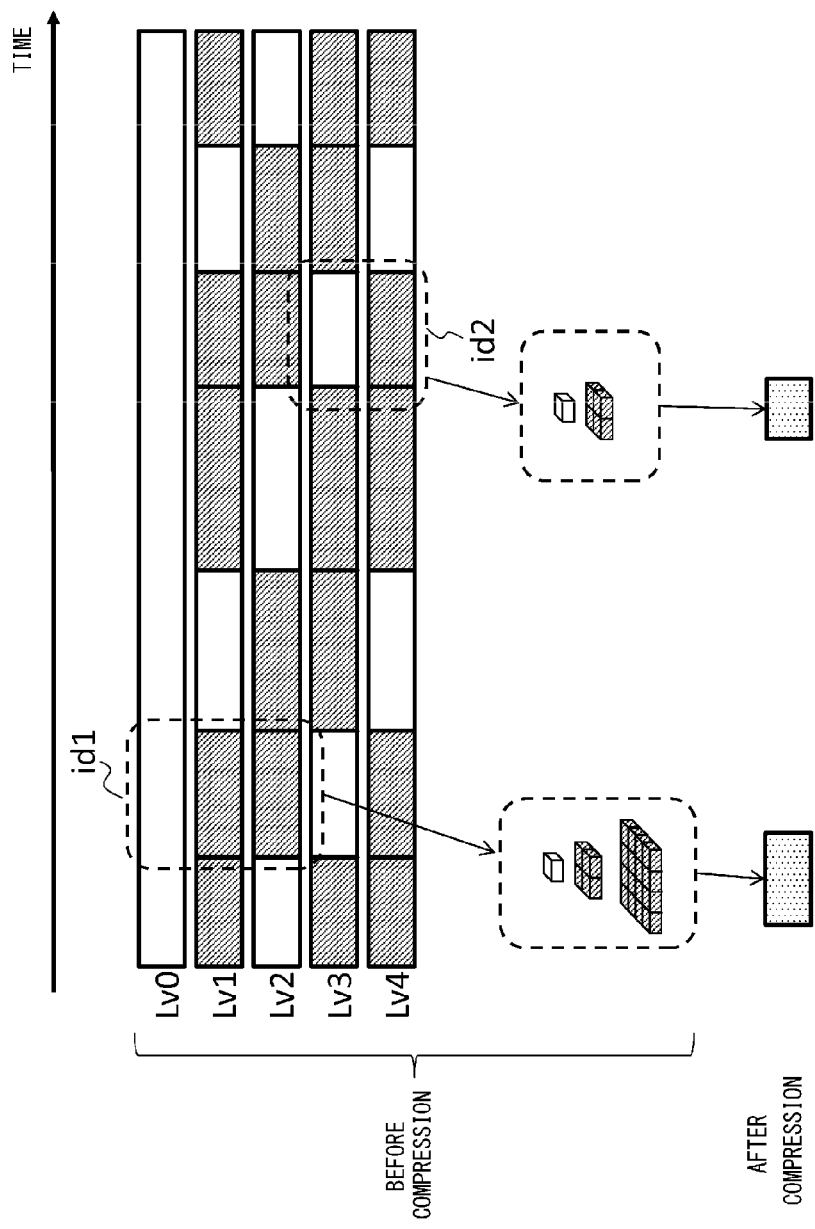
FIG. 14 shows a configuration of a moving image stream in the case that data on tile images that represent a same area on a plurality of layers is grouped and compressed in accordance with the present embodiment.

In such an embodiment, in the case that original image data and difference image data coexist in one moving image stream as described above, processing efficiency at the time of displaying can be improved by configuring the moving image stream while considering the switching time points thereof. FIGS. 12 through 14 show examples of the configuration of a moving image stream. FIG. 12 shows the case where the order of moving image frames is adopted without change as the data order of the moving image stream. In the figure, the upper rectangles indicate a series of tile images, which are the result of extraction of an area of a certain tile image in a series of frames before compression encoding, and the horizontal axis indicates the time axis on an moving image. The lower part of the figure shows a moving image stream after the compression encoding, where the left end is the head of the stream. Before and after the compression encoding, a portion corresponding to original image data is shown by a white rectangle and a portion corresponding to difference image data is shown by a hatched rectangle.

In the following explanation, also a "tile image" included in a frame is sometimes referred to as a "frame" so that the meaning of images arranged in chronological order of a moving image can be understood easily. In the case of the figure, first, before the compression encoding, a series of frames of an original image i1, a series of frames of a difference image d1, a series of frames of an original image i2, a series of frames of a difference image d2, . . . , are arranged alternately. Compressed data i'1, d'1, i'2, d'2, . . . , which are compressed and encoded respective series of frames, are formed into a moving image stream in the order without change. In the case that compression encoding is performed for each frame independently, that is, in the case that all frames are treated as an intra frame, merely connecting the compressed and encoded data simply in the order of frames is sufficient.

On the other hand, in the case of increasing the compression rate by using temporal redundancy of images, for example by inter-predictive coding, or the like, it is preferable that data dependency does not affect over different types of frame series (i.e., an original image and a difference image). That is, the data is configured so that in order to decode compressed data d'1 of a difference image, the use of the compressed data i'1 of an original image before the compressed data d'1 is not required. In a similar manner, the data is configured so that in order to decode compressed data i'2 of an original image, the use of the compressed data d'1 of a difference image before the compressed data i'2 is not required.

With this, processing for decoding a frame is completed in a same type of data whenever the data is accessed, so that the latency of the processing can be suppressed. Therefore, a frame right after a switch between types (i.e., data on a head frame of respective compressed data i'1, d'1, i'2, d'2, . . . ) is set as an intra frame, which can be decoded independently. In this manner, dependency of data between frames is reset. Thus, compressed data i'1, d'1, i'2, d'2, . . . , which are separated depending on the type of an image, can be formed into individual moving image streams. Since the characteristics of images, such as a frequency characteristic or the like, are different between an original image and a difference image, different compression method may be used.

FIG. 13 shows a case where a same type of frame data is extracted from a series of frames, grouped and compressed so as to form one unit of compressed data. Although the figure is mostly presented in a similar manner to that of FIG. 12, series of frames of an original image before compression encoding and series of frames of a difference image before compression encoding are presented by shifting vertically in FIG. 13. The time axis is common to both series of frames. From such series of frames before compression encoding, a plurality of (five in the figure) blocks of consecutive series of frame of an original image are extracted, starting from the head, and the extracted blocks are combined into a series of frames i3 having a new chronological order. Next, the same number of blocks of series of frame of a difference image, positioned right after the extracted blocks of series of frames of an original image respectively, are extracted and the extracted blocks are combined into a series of frames d3 having a new chronological order.

In a similar manner, blocks are combined into a series of frames i4 of an original image, a series of frames d4 of a difference image, . . . . Each of the compressed data i'3, d'3, i'4, d'4, . . . , which are compressed and encoded series of frames i3, d3, i4, d4, . . . extracted and combined for each type of an image, is treated as one unit of compressed data. The generated compressed data may be formed into individual moving image stream for each unit, or may be connected in the order of generation and formed into a moving image stream. A boundary when combining series of frames may be set as time when an accumulated number of frames or an accumulated amount of data size surpasses a predetermined threshold. Alternatively, head frames or the like included in blocks of series of frames that are arranged consecutively when extracted may be compared, and the boundary may be set as time when a difference between the head frames surpasses a threshold. It may occur at a timing of scene change, or the like.

As explained in FIG. 12, when decoding a frame that is accessed arbitrarily, it is preferable that data on a head frame of various types of data in a compressed and encoded moving image stream is set as an intra frame, so that data required for the decoding does not extend to another type of series of frames. However, in the case of switching between an original image and a difference image at high frequency due to a high bit rate of an image, or the like, if all the frames right after the switch are set as an intra frame, the number of intra frames will increase and the compression rate will decrease.

Also in the case that temporal redundancy continues for a long time (e.g., in the case that a target object does not move), the compression rate may be reduced in vain by inserting an intra frame when an original image and a difference image are switched. In such a case, as described above, by combining a same type of series of frames, which are temporally discontinuous, and forming one unit of compressed data, so as to reduce the number of frames to be set as an intra frame, prevention of the dependency from extending to a different type of frame series, and an improvement of compression rate can be compatible.

In this embodiment, since the order of compressed and encoded data is different from the order of frames in an original moving image, information that associates the order of original frames and the order of data in the compressed and encoded data with each other is attached to the compressed and encoded data. When displaying a moving image, by referring to the information, the decoded frames are rearranged in the original order and displayed.

FIG. 14 shows the case where data on tile images that represent a same area on a plurality of layers is grouped and compressed so as to form one unit of compressed data. Although the figure is mostly presented in a similar manner to that of FIG. 12, series of frame of five layers (i.e., the 0-th layer Lv0, the first layer Lv1, the second layer Lv2, the third layer Lv3, and the fourth layer Lv4) are shown as series of frames before compression encoding with a common time axis. A rectangle in each layer represents one or more series of tile images symbolically. Further, data after compression encoding is shown by a rectangle with a different type of hatching from that for difference image data, since the data after compression encoding according to the embodiment includes both original image data and difference image data.

By setting the top layer of a plurality of layers that are combined as one unit of compressed data as an original image layer, it is not necessary to read out another moving image stream in order to acquire data required for restoring an original image from a difference image. Therefore, display processing can be performed efficiently. As a result, latency until displaying is suppressed for any case of displaying using any of the layers. Thus, the embodiment is especially effective for the case where a resolution is selected in a display device and the case where the resolution is set variable.

The sizes of images indicating a same area on a plurality of layers are different since the resolutions thereof are different. Therefore, in the case that hierarchical data has layers where data on each layer is increased to 2×2 times of that of an immediately adjacent layer, one tile of image of an upper layer and four tiles of image of a lower layer are combined into one unit of compressed data when combining data on two layers as shown in the figure. When combining data on three layers, one tile of image of a top layer, four tiles of image of a middle layer, and sixteen tiles of image of a bottom layer are combined into one unit of compressed data. The same applies to the case of more than three layers.

Although frames included in one unit of compressed data belong to different layers, the frames belong to a same period on a moving image. As shown in the figure, in the layers to be combined, all frames that are included in a no-switch period during which the switch between an original image layer and a difference image layer is not made may be combined into one unit of compressed data. Alternatively, frames included in a period shorter than the no-switch period may be combined into one unit of compressed data. In the latter case, frames may be grouped by providing a threshold value for an accumulated number of frames and/or an accumulated amount of data size. The data order for compressed and encoded data is not limited as far as the data is associated with a frame number, a layer, and an area before compression encoding.

As described above, the embodiment shown in FIG. 14 has an advantage that data on an original image layer can be easily accessed when restoring an original image from a difference image. On the other hand, data on an unnecessary difference image is also transmitted together even in the case of displaying an image with a resolution of the original image layer. Therefore, in order to prevent such status from continuing for a long period, the number of frames included in one unit of compressed data is adjusted, for example by increasing the switching frequency between an original image layer and a difference image layer.

Next, an explanation will be given on a device that generates compressed moving image data explained above.

This device can also be implemented by a configuration similar to that of the image processing device 10 shown in FIG. 4. An explanation will be given below while focusing on the configuration of the control unit 100. FIG. 15 shows a detailed configuration of a control unit 100b provided with a function of generating compressed moving image data and a hard disk drive 50 in accordance with the present embodiment.

The control unit 100b includes a scheduling unit 130, a hierarchical data generating unit 132, and a compressed data generating unit 134. The scheduling unit 130 determines a schedule for the allocation of an original image layer and a difference image layer. The hierarchical data generating unit 132 generates data on each layer in accordance with the determined allocation schedule. The compressed data generating unit 134 compresses and encodes hierarchical data in accordance with a predetermined rule and generates a moving image stream. The hard disk drive 50 includes a moving image data storage unit 136 that stores moving image data to be processed, and a compressed-data storage unit 140 that stores compressed and encoded moving image data.

The moving image data to be processed stored in the moving image data storage unit 136 may be commonly-used moving image data comprising a series of frames where frames depicted with one resolution at respective time points are arranged in chronological order. The scheduling unit 130 determines a schedule for the allocation of an original image layer and a difference image layer on the basis of one of the scheduling policies explained by referring to FIGS. 8 to 11. The number of layers is determined based on the resolution of an original moving image frame. Which policy is to be selected from the various scheduling policies described above may be defined in the device in advance, or may be configured so that a user can select a policy via the input device 20. Alternatively, the selection of a policy may be determined based on the characteristic of an image and/or the type of the moving image attached to the moving image data as meta data.

The hierarchical data generating unit 132 reads moving image data to be processed from the moving image data storage unit 136, and reduces each frame to a predetermined plurality of resolutions so as to generate hierarchical data comprising original images. In accordance with the allocation schedule determined by the scheduling unit 130, the hierarchical data generating unit 132 specifies a layer that should be set as a difference image layer for each frame, and converts data on the specified layer into difference image data by calculating a subtraction from an original image on an original image layer or from a difference image directly above. Further, the hierarchical data generating unit 132 divides an image on each layer into predetermined sized images so as to form tile images.

The compressed data generating unit 134 performs compression encoding with one of the methods, which are explained above while referring to FIGS. 12 to 14, so as to generate a moving image stream. The generated moving image stream is stored in the compressed-data storage unit 140. In this process, information regarding the configuration of the moving image stream (e.g., information that associates the positions of data in the moving image stream and the order of an original moving image frames with each other) is attached to the header or the like of the moving image stream. Further, a correspondence relationship between an area of a tile image on an image plane of each layer and a moving image stream, and information regarding a schedule for the allocation of an original image layer and a difference image layer are also attached.

Figure 16:
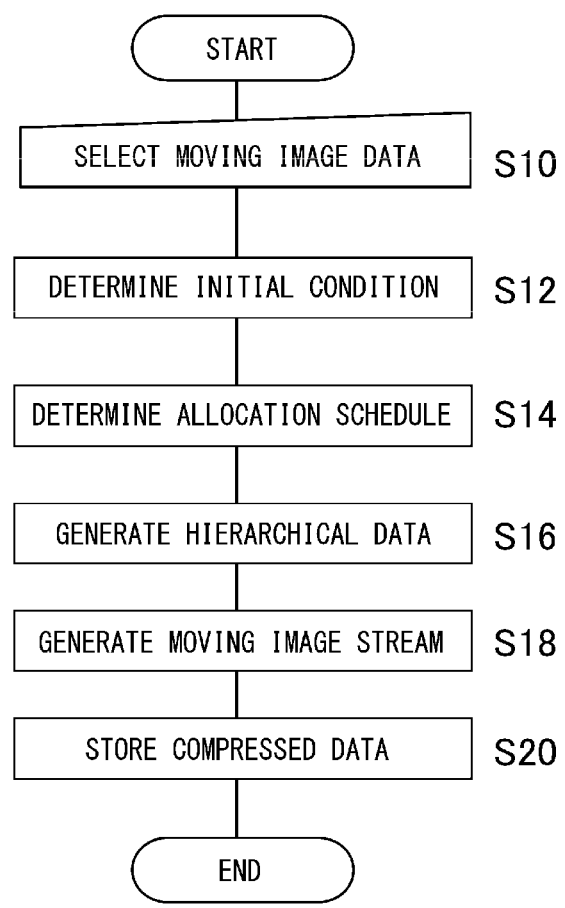
FIG. 16 shows a flowchart indicating a processing procedure where a device for generating compressed moving image data generates compressed data on a moving image in accordance with the present embodiment.

Next, an explanation will be given on the operation of respective devices for implementing the configuration described above. FIG. 16 shows a processing procedure where a device for generating compressed moving image data generates compressed data on a moving image. First, a user selects moving image data to be processed that is stored in the moving image data storage unit 136 of the hard disk drive 50 (S10), and the scheduling unit 130 determines an initial condition, such as the number of layers to be generated, a scheduling policy, or the like, and determines a schedule for the allocation of an original image layer and a difference image layer on the basis of the initial condition (S12 and S14), accordingly.

Next, the hierarchical data generating unit 132 reads moving image data to be processed from the moving image data storage unit 136, and reduces each frame to a plurality of sizes so as to generate hierarchical data. Further, the hierarchical data generating unit 132 generates a difference image for a difference image layer, updates the hierarchical data, and divides images on all layers into tile images. By generating such hierarchical data for each frame of each time point, hierarchical data of a four dimensional configuration, where a time axis is added to the virtual three dimensional x y z axes as shown in FIG. 6, is generates (S16).

Next, the compressed data generating unit 134 compresses and encodes image data in the order of frame sequence shown in FIGS. 12 to 14 so as to generate a moving image stream (S18). In this process, all tile images may be set as intra frames, or an intra frame, a forward-predicted frame and/or a bi-directionally predicted frame that have a dependency to another frame may coexist. In the latter case, as a result, a difference image layer retains data where temporal difference is also calculated with respect to a difference image in the resolution direction. As described above, a frame right after the type of an image is switched in a series of frames is set as an intra frame.

Next, the compressed data generating unit 134 generates: a correspondence relationship between an area of a tile image on an image plane of each layer and a moving image stream; information regarding a schedule for the allocation of an original image layer and a difference image layer; and information regarding the configuration of a moving image stream, attaches the information to a group of moving image streams so as to form definitive compressed moving image data and stores the data in the hard disk drive 50 (S20).

Figure 17:
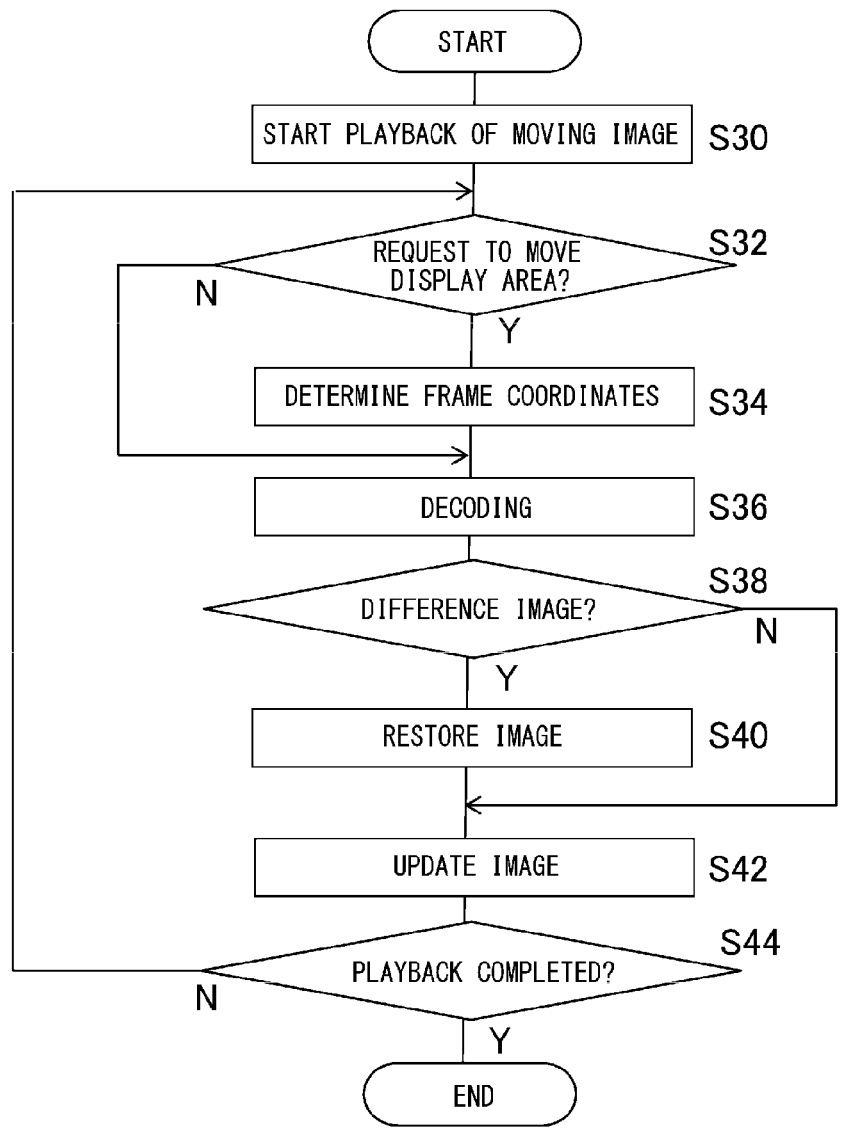
FIG. 17 shows a flowchart indicating a processing procedure where a device for displaying an image displays a moving image in accordance with the present embodiment.

FIG. 17 shows a processing procedure for allowing a device for displaying an image to display a moving image. First, a user instructs to start the playback of a moving image via the input device 20, and then the displaying of the moving image is started on the display device 12 by cooperative working of the loading unit 108, the decoding unit 112, the display image processing unit 114, and the display processing unit 44 (S30). The compressed moving image data may be data stored in the hard disk drive 50, or may be data acquired from a moving image server via a network.

If the user requests to move a display area by inputting an operation for zooming in a certain position in a moving image being displayed, an operation for moving a viewpoint vertically or horizontally, or the like via the input device 20 (Y in S32), the frame coordinate determination unit 110 calculates a movement velocity vector of a display area in the virtual space from the signal requesting to move a display area, and determines frame coordinates at respective frame displaying time points, sequentially (S34).

Regardless of whether or not the display area is moved (S34 or N in S32), the decoding unit 112 determines a layer to be used for displaying included in the hierarchical data on the moving image on the basis of the z coordinate of the frame coordinates of a next frame. The decoding unit 112 further specifies a moving image stream of a tile image corresponding to the display area on the determined layer on the basis of the x coordinate and y coordinate, reads out the stream from the main memory 60, decodes the stream, and stores the decoded data into the buffer memory 70 (S36). The moving image stream is loaded in the main memory 60 by cooperative working of the loading area determination unit 106 and the loading unit 108. A similar decoding procedure is used regardless of whether data to be decoded is data on an original image or data on a difference image.

That is, if the frame is an intra frame, the frame is decoded independently, and if the frame is a frame other than an intra frame, the frame is decoded by using a reference image. In the case that the data order of a moving image stream is different from the frame sequence of an original moving image, target data is specified based on the correspondence information attached to the moving image stream.

Next, the decoding unit checks whether or not the decoded image is a difference image (S38). Whether or not the decoded image is a difference image is determined by referring to information on the allocation schedule attached to the compressed data on moving image as described above. In an embodiment where a switch is made regularly (e.g., a switch is made for each predetermined number of frames) a difference image layer may be specified based on a frame number or the like, and whether or not the decoded image is a difference image may be determined on the spot.

If the decoded image is a difference image, an image is restored by decoding an image depicting the same area on an upper layer and by calculating addition for respective pixels, and data in the buffer memory 70 is updated (S40). In the case that a layer directly above is also a difference image, a search is made layer by layer upwardly for an original image. In this process, whether to sum up difference images sequentially or to add only an image on an original image layer directly may be defined as a mode for each piece of moving image data.

Next, images at respective time points are updated by allowing the display image processing unit 114 to use data on a tile image stored in the buffer memory 70 so as to render an image of a display area in a frame buffer of the display processing unit 144 and by allowing the display processing unit 144 to output the image to the display device 12 (S42). By repeating the processes described above for each frame, a playback of the moving image is progressed while allowing the movement of a display area (N in S44, 532-S42). If the playback of the moving image is completed, or if the user stops the playback, the process is completed (Y in S44).

According to the embodiment described above, by configuring hierarchical data where each frame of a moving image is represented with a plurality of resolutions, and by forming a moving image stream for each tile image from the hierarchical data, a layer to be used for displaying is switched to another layer and a moving image stream to be used for displaying is switched to another stream in accordance with the movement of a display area, including a change in resolution. In this process, at least one layer of the hierarchical data is set as a difference image from an image on an upper layer. With this, an increase in data size can be suppressed even if a moving image is configured as hierarchical data.

Further, the allocation of an original image layer that retains data on an original image and a difference image layer that retains data on a difference image is switched among layers constituting the hierarchical data. With this, also in an embodiment where only a part of data on a moving image is transmitted from a hard disk drive or an image server, the bit rate required for the transmission can be averaged, and a bandwidth required for the transmission can be suppressed. As a result, even with a narrow bandwidth, data transmission can be implemented without hindrance to responsiveness to a movement of a display area, and even a huge sized image of the order of giga pixels can be displayed with small memory capacity.

Further, a schedule for the allocation of an original image layer and a difference image layer and/or the configuration of a moving image stream can be optimized in accordance with the characteristics of an moving image, the processing capability of a display device, or the like. Therefore, a moving image data according to the embodiment can be introduced to a wide variety of environments, from a cellular phone to a general-purpose computer, in a similar manner.

Given above is an explanation based on the embodiments. The embodiments are intended to be illustrative only and it will be obvious to those skilled in the art that various modifications to constituting elements and processes could be developed and that such modifications are also within the scope of the present invention.

For example, according to the embodiment, image data on a certain layer is basically stored as a difference image from an enlarged image of an image on a layer with a resolution lower than that of the certain layer. On the other hand, an image on a same layer (i.e., an image with a single resolution) may be divided into areas and data on an image in a certain area may be stored as a deference image from an image in another area. The "image in another area" that is referred to may be an original image, or may be a difference image of which the original image is an image in a yet another area or of which the original image is an image on another layer. Also in this case, by temporally switching an area set as a difference image, and an area set as an original image, the bit rate can be averaged, and a bandwidth required for transmission can be suppressed. This embodiment is especially effective for an image including an area that is almost monochrome and/or an area with a repetitive pattern.

DESCRIPTION OF THE REFERENCE NUMERALS

1 image processing system, 10 image processing device, 12 display device, 20 input device, 30 0-th layer, 32 first layer, 34 second layer, 36 third layer, 44 display processing unit, 50 hard disk drive, 60 main memory, 70 buffer memory, 100 control unit, 100*b* control unit, 102 input information acquisition unit, 106 loading area determination unit, 108 loading unit, 110 frame coordinate determination unit, 112 decoding unit, 114 display image processing unit, 130 scheduling unit, 132 hierarchical data generating unit, 134 compressed data generating unit, 136 moving image data storage unit, and 140 compressed-data storage unit.

INDUSTRIAL APPLICABILITY

As described above, the present invention may be applicable to an information processing device and an information processing system such as, a computer, a game device, an image generation device, an image display device, or the like.

The invention claimed is:

1. A moving image data generation device comprising a microprocessor operating under the control of a computer program to generate hierarchical moving data, including a plurality of series of images, each series of images being a representation of image frames constituting one moving image at a respective differing resolution and at a respective layer within a hierarchy, the hierarchical moving data serving as a basis for generating a display image, the moving image data generation device comprising:

a hierarchical data generating unit configured to generate the hierarchical moving image data by: (i) generating a respective plurality of the image frames at each layer within the hierarchy at a respective one of the resolutions, wherein at least one of the layers is an original image layer in which the plurality of image frames therein represent original image data, and at least two of the layers are difference image layers in which the respective plurality of image frames of each of the difference image layers represent respective difference image data, and (ii) generating each image frame of the plurality of image frames of each of the difference image layers by subtracting respective data of two corresponding image frames at two different layers within the hierarchy, such that the display image is produced by enlarging a plurality of image frames containing original image data to a desired size and adding a plurality of the image frames containing difference image data;

a compressed data generating unit configured to compress and encode the hierarchical moving image data generated by the hierarchical data generating unit, and to store the compressed and encoded hierarchical moving image data in a storage device; and a scheduling unit configured to determine a switching schedule for allocating the at least one original image layer and the at least two difference image layers within the hierarchy at successive time intervals, wherein at least one of the time intervals includes the at least two difference image layers being allocated to vertically-consecutive layers such that a first of the at least two difference image layers is directly above a second of the at least two difference image layers, and wherein the difference image data of the second of the at least two difference image layers is generated by a subtraction from the difference image data of the first of the at least two difference image layers.

2. The moving image data generation device according to claim 1, wherein the switching schedule for allocating the at least one original image layer and the at least two difference image layers includes changing where, within the hierarchy, at least one of the at least two difference image layers is located as a function of the successive time intervals, wherein the hierarchical data generating unit specifies which of the layers within the hierarchy are set as difference image layers for each image frame in accordance with the switching schedule determined by the scheduling unit, and generates the hierarchical moving image data.

3. The moving image data generation device according to claim 2, wherein the scheduling unit determines whether to retain the difference image data for the at least two difference image layers at each successive time interval, and switches the allocation except a layer with a lowest resolution among the layers of the hierarchy constituting the hierarchical moving image data.

4. The moving image data generation device according to claim 2, wherein the scheduling unit determines whether to retain the difference image data for the at least two difference image layers at each successive time interval, and switches the allocation except a layer with a lowest resolution.

5. The moving image data generation device according to claim 2, wherein the scheduling unit determines whether to retain the difference image data for at least an area in at least one of the layers.

6. The moving image data generation device according to claim 2, wherein the scheduling unit switches the allocation for each of a predetermined number of image frames.

7. The moving image data generation device according to claim 2, wherein the scheduling unit acquires information regarding a timing of a scene change in the moving image, and switches the allocation at the timing of the scene change.

8. The moving image data generation device according to claim 2, wherein the scheduling unit switches the allocation when an accumulated amount of data size of a switching unit per a unit of area reaches a predetermined threshold value.

9. The moving image data generation device according to claim 1, wherein the compressed data generating unit:

groups chronological data on tile images generated by dividing an image on each layer in the hierarchical moving image data generated by the hierarchical data generating unit by a predetermined size, on the basis of whether the data is on a-one of the at least two difference image layers;

generates new chronological data by combining the grouped chronological data for each group of the grouping in accordance with a predetermined rule; and compresses and encodes the new chronological data in order of the data.

10. The moving image data generation device according to claim 1, wherein the compressed data generating unit compresses and encodes the hierarchical moving image data, which is generated by the hierarchical data generating unit, for respective chronological data on tile images, which are generated by dividing an image on each layer by a predetermined size, regardless of whether the data is on one of the at least two difference image layers.

11. The moving image data generation device according to claim 9, wherein the compressed data generating unit sets at least data on a first tile image after switching to/from a difference image, the data on a first tile image included in chronological data to be compressed, as an intra frame that can be decoded independently.

12. The moving image data generation device according to claim 1, wherein the compressed data generating unit combines and compresses chronological data on tile images, which are generated by dividing by a predetermined size an image on each layer in the hierarchical moving image data generated by the hierarchical data generating unit, for each same area on images on plurality of layers so as to form a unit of compressed data, and wherein one unit of compressed data is configured so that the top layer among a plurality of layers included in the unit retains data on an original image required in order to restore a difference image retained by another layer.

13. A moving image display device comprising a microprocessor operating under the control of a computer program, the moving image display device comprising:

a moving image data storage unit configured to store hierarchical moving data, including a plurality of series of images, each series of images being a representation of image frames constituting one moving image at a respective differing resolution and at a respective layer within a hierarchy, the hierarchical moving data serving as a basis for generating a display image;

an input information acquisition unit configured to acquire a signal requesting to move a display area in the moving image being displayed;

a display image processing unit configured to generate the display image according to the signal requesting to move for each image frame, and in accordance with a required resolution determined by the signal requesting to move acquired by the input information acquisition unit, wherein the hierarchical moving data is produced by:

a hierarchical data generating unit configured to generate the hierarchical moving image data by: (i) generating a respective plurality of the image frames at each layer within the hierarchy at a respective one of the resolutions, wherein at least one of the layers is an original image layer in which the plurality of image frames therein represent original image data, and at least two of the layers are difference image layers in which the respective plurality of image frames of each of the difference image layers represent respective difference image data, and (ii) generating each image frame of the plurality of image frames of each of the difference image layers by subtracting respective data of two corresponding image frames at two different layers within the hierarchy, such that the display image is produced by enlarging a plurality of image frames containing original image data to a desired size and adding a plurality of the image frames containing difference image data;

a compressed data generating unit configured to compress and encode the hierarchical moving image data generated by the hierarchical data generating unit, and to store the compressed and encoded hierarchical moving image data in a storage device; and a scheduling unit configured to determine a switching schedule for allocating the at least one original image layer and the at least two difference image layers within the hierarchy at successive time intervals, wherein at least one of the time intervals includes the at least two difference image layers being allocated to vertically-consecutive layers such that a first of the at least two difference image layers is directly above a second of the at least two difference image layers, and wherein the difference image data of the second of the at least two difference image layers is generated by a subtraction from the difference image data of the first of the at least two difference image layers.

14. The moving image display device according to claim 13, wherein the switching schedule for allocating the at least one original image layer and the at least two difference image layers includes changing where, within the hierarchy, at least one of the at least two difference image layers is located as a function of the successive time intervals, wherein the hierarchical data generating unit specifies which of the layers within the hierarchy are set as difference image layers for each image frame in accordance with the switching schedule determined by the scheduling unit, and generates the hierarchical moving image data.

15. The moving image display device according to claim 14, wherein the allocation is changed for each of a predetermined number of frames, and the display image processing unit derives whether data used for displaying is difference image data by specifying a layer having the difference image data for each image frame on the basis of the predetermined number of image frames.

16. The moving image display device according to claim 14, wherein the moving image data storage unit further stores information regarding the switching schedule while associating the information with the hierarchical moving image data, and wherein the display image processing unit specifies whether data used for displaying is difference image data by referring to the switching schedule.

17. The moving image display device according to claim 13, wherein the hierarchical moving image data includes a plurality of units of compressed data, which are compressed and encoded chronological data that is different from chronological order of image frames in a moving image and that is grouped depending on whether the data is data on a difference image, wherein the moving image data storage unit further stores correspondence information that associates order of image frames in the moving image and order of data in the unit of compressed data with each other while associating the correspondence information with the hierarchical moving image data, and wherein the display image processing unit rearranges the decoded data in the order of original image frames based on the correspondence information.

18. An apparatus comprising a microprocessor operating under the control of a computer program to implement a moving image data generation method comprising:

generating hierarchical moving data, including a plurality of series of images, each series of images being a representation of image frames constituting one moving image at a respective differing resolution and at a respective layer within a hierarchy, the hierarchical moving data serving as a basis for generating a display image by:

reading moving image data comprising a series of image frames depicted with one resolution from a storage device;

generating a respective plurality of the image frames at each layer within the hierarchy at a respective one of the resolutions, wherein at least one of the layers is an original image layer in which the plurality of image frames therein represent original image data, and at least two of the layers are difference image layers in which the respective plurality of image frames of each of the difference image layers represent respective difference image data;

generating each image frame of the plurality of image frames of each of the difference image layers by subtracting respective data of two corresponding image frames at two different layers within the hierarchy, such that the display image is produced by enlarging a plurality of image frames containing original image data to a desired size and adding a plurality of the image frames containing difference image data;

compressing and encoding the hierarchical moving image data and storing the compressed encoded hierarchical moving image data in the storage device; and determining a switching schedule for allocating the at least one original image layer and the at least two difference image layers within the hierarchy at successive time intervals, wherein at least one of the time intervals includes the at least two difference image layers being allocated to vertically-consecutive layers such that a first of the at least two difference image layers is directly above a second of the at least two difference image layers, and wherein the difference image data of the second of the at least two difference image layers is generated by a subtraction from the difference image data of the first of the at least two difference image layers.

19. A moving image displaying method, comprising:
reading from a storage device at least a portion of hierarchical moving data, including a plurality of series of images, each series of images being a representation of image frames constituting one moving image at a respective differing resolution and at a respective layer within a hierarchy, the hierarchical moving data serving as a basis for generating a display image;
displaying the moving image on a display device by using the at least a portion of hierarchical moving data;
acquiring a signal requesting to move a display area in the moving image being displayed;
generating the display image according to the signal requesting to move for each image frame, and in accordance with a required resolution determined by the signal requesting to move; and
displaying the generated display image on the display device, wherein the hierarchical moving data is produced by:
generating a respective plurality of the image frames at each layer within the hierarchy at a respective one of the resolutions, wherein at least one of the layers is an original image layer in which the plurality of image frames therein represent original image data, and at least two of the layers are difference image layers in which the respective plurality of image frames of each of the difference image layers represent respective difference image data;
generating each image frame of the plurality of image frames of each of the difference image layers by subtracting respective data of two corresponding image frames at two different layers within the hierarchy, such that the display image is produced by enlarging a plurality of image frames containing original image data to a desired size and adding a plurality of the image frames containing difference image data;
compressing and encoding the hierarchical moving image data and storing the compressed encoded hierarchical moving image data in the storage device; and
determining a switching schedule for allocating the at least one original image layer and the at least two difference image layers within the hierarchy at successive time intervals,
wherein at least one of the time intervals includes the at least two difference image layers being allocated to vertically-consecutive layers such that a first of the at least two difference image layers is directly above a second of the at least two difference image layers, and wherein the difference image data of the second of the at least two difference image layers is generated by a subtraction from the difference image data of the first of the at least two difference image layers.

20. A non-transitory, computer-readable recording medium embodying a computer program, which when executed by a computer, causes the computer to carry out actions, comprising:
generating hierarchical moving data, including a plurality of series of images, each series of images being a representation of image frames constituting one moving image at a respective differing resolution and at a respective layer within a hierarchy, the hierarchical moving data serving as a basis for generating a display image by:
reading moving image data comprising a series of image frames depicted with one resolution from a storage device;
generating a respective plurality of the image frames at each layer within the hierarchy at a respective one of the resolutions, wherein at least one of the layers is an original image layer in which the plurality of image frames therein represent original image data, and at least two of the layers are difference image layers in which the respective plurality of image frames of each of the difference image layers represent respective difference image data;
generating each image frame of the plurality of image frames of each of the difference image layers by subtracting respective data of two corresponding image frames at two different layers within the hierarchy, such that the display image is produced by enlarging a plurality of image frames containing original image data to a desired size and adding a plurality of the image frames containing difference image data;
compressing and encoding the hierarchical moving image data and storing the compressed encoded hierarchical moving image data in the storage device; and
determining a switching schedule for allocating the at least one original image layer and the at least two difference image layers within the hierarchy at successive time intervals,
wherein at least one of the time intervals includes the at least two difference image layers being allocated to vertically-consecutive layers such that a first of the at least two difference image layers is directly above a second of the at least two difference image layers, and wherein the difference image data of the second of the at least two difference image layers is generated by a subtraction from the difference image data of the first of the at least two difference image layers.

21. A non-transitory, computer-readable recording medium embodying a computer program, which when executed by a computer, causes the computer to carry out actions, comprising:
reading from a storage device at least a portion of hierarchical moving data, including a plurality of series of images, each series of images being a representation of image frames constituting one moving image at a respective differing resolution and at a respective layer within a hierarchy, the hierarchical moving data serving as a basis for generating a display image;
displaying the moving image on a display device by using the at least a portion of hierarchical moving data;
acquiring a signal requesting to move a display area in the moving image being displayed;
generating the display image according to the signal requesting to move for each image frame, and in accordance with a required resolution determined by the signal requesting to move; and
displaying the generated display image on the display device, wherein the hierarchical moving data is produced by:
generating a respective plurality of the image frames at each layer within the hierarchy at a respective one of the resolutions, wherein at least one of the layers is an original image layer in which the plurality of image frames therein represent original image data, and at least two of the layers are difference image layers in which the respective plurality of image frames of each of the difference image layers represent respective difference image data;

generating each image frame of the plurality of image frames of each of the difference image layers by subtracting respective data of two corresponding image frames at two different layers within the hierarchy, such that the display image is produced by enlarging a plurality of image frames containing original image data to a desired size and adding a plurality of the image frames containing difference image data;

compressing and encoding the hierarchical moving image data and storing the compressed encoded hierarchical moving image data in the storage device; and determining a switching schedule for allocating the at least one original image layer and the at least two difference image layers within the hierarchy at successive time intervals, wherein at least one of the time intervals includes the at least two difference image layers being allocated to vertically-consecutive layers such that a first of the at least two difference image layers is directly above a second of the at least two difference image layers, and wherein the difference image data of the second of the at least two difference image layers is generated by a subtraction from the difference image data of the first of the at least two difference image layers.

22. A non-transitory computer-readable recording medium embodying a data structure of a moving image file generated from hierarchical moving data, the hierarchical moving data is produced by:

generating a respective plurality of the image frames at each layer within the hierarchy at a respective one of the resolutions, wherein at least one of the layers is an original image layer in which the plurality of image frames therein represent original image data, and at least two of the layers are difference image layers in which the respective plurality of image frames of each of the difference image layers represent respective difference image data;

generating each image frame of the plurality of image frames of each of the difference image layers by subtracting respective data of two corresponding image frames at two different layers within the hierarchy, such that the display image is produced by enlarging a plurality of image frames containing original image data to a desired size and adding a plurality of the image frames containing difference image data;

compressing and encoding the hierarchical moving image data and storing the compressed encoded hierarchical moving image data in the storage device; and determining a switching schedule for allocating the at least one original image layer and the at least two difference image layers within the hierarchy at successive time intervals, wherein at least one of the time intervals includes the at least two difference image layers being allocated to vertically-consecutive layers such that a first of the at least two difference image layers is directly above a second of the at least two difference image layers, and wherein the difference image data of the second of the at least two difference image layers is generated by a subtraction from the difference image data of the first of the at least two difference image layers.

23. The medium according to claim 22, wherein a layer including the difference image data is switched to another layer in the hierarchical data with passage of time of the moving image, and wherein the switching schedule switches a layer having the difference image data to another layer, and information used for specifying whether data used for displaying is referred to when displaying data on a difference image.

* * * * *